(12) United States Patent
Zettsu et al.

(10) Patent No.: US 10,042,575 B2
(45) Date of Patent: Aug. 7, 2018

(54) MEMORY SYSTEM INCLUDING A BATTERY POWERED BUFFER WITH A STORAGE CAPACITY OF THAT BUFFER DEPENDENT ON THE VOLTAGE LEVEL OF THE BATTERY

(71) Applicant: Toshiba Memory Corporation, Minato-ku, Tokyo (JP)

(72) Inventors: Tatsuya Zettsu, Yokohama Kanagawa (JP); Yoshihisa Kojima, Kawasaki Kanagawa (JP); Katsuhiko Ueki, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 231 days.

(21) Appl. No.: 14/852,254

(22) Filed: Sep. 11, 2015

(65) Prior Publication Data
US 2016/0259589 A1 Sep. 8, 2016

Related U.S. Application Data

(60) Provisional application No. 62/129,674, filed on Mar. 6, 2015.

(51) Int. Cl.
*G06F 12/00* (2006.01)
*G06F 13/00* (2006.01)
*G06F 13/28* (2006.01)
*G06F 3/06* (2006.01)
*G06F 1/32* (2006.01)

(52) U.S. Cl.
CPC .......... *G06F 3/0634* (2013.01); *G06F 1/3287* (2013.01); *G06F 3/0619* (2013.01); *G06F 3/0656* (2013.01); *G06F 3/0685* (2013.01); *G06F 1/3234* (2013.01); *G06F 3/0688* (2013.01); *G06F 2212/1028* (2013.01)

(58) Field of Classification Search
CPC .... G06F 3/0634; G06F 3/0619; G06F 3/0656; G06F 3/0685; G06F 3/0688; G06F 2212/1028; G06F 1/3234; G06F 1/3287
USPC .................................. 711/103; 713/320, 324
See application file for complete search history.

(56) References Cited

U.S. PATENT DOCUMENTS

| | | | | |
|---|---|---|---|---|
| 2004/0054851 | A1* | 3/2004 | Acton | G06F 11/1441 711/118 |
| 2012/0246398 | A1* | 9/2012 | Hosaka | G06F 11/1441 711/103 |
| 2013/0097451 | A1 | 4/2013 | Kuroda et al. | |
| 2013/0254464 | A1 | 9/2013 | Kimura et al. | |
| 2013/0304966 | A1* | 11/2013 | Joo | G06F 12/0246 711/103 |

(Continued)

FOREIGN PATENT DOCUMENTS

JP 2013-061791 A 4/2013

*Primary Examiner* — Mark Giardino, Jr.
*Assistant Examiner* — Shane Woolwine
(74) *Attorney, Agent, or Firm* — White & Case LLP

(57) ABSTRACT

According to one embodiment, a memory system includes a nonvolatile memory, a buffer, a battery and a processing circuit. The battery stores energy supplied from the outside. The processing circuit, after start of the supply of energy from the outside, starts the acceptance of a request from the outside, starts a process in accordance with the accepted request, and restricts the amount of data in the buffer referring to a voltage of the battery. The process uses the buffer.

20 Claims, 19 Drawing Sheets

(56) References Cited

U.S. PATENT DOCUMENTS

| | | | |
|---|---|---|---|
| 2014/0181558 A1* | 6/2014 | Taha | G06F 1/3206 |
| | | | 713/323 |
| 2015/0089210 A1* | 3/2015 | Lai | G06F 9/442 |
| | | | 713/2 |
| 2015/0234609 A1* | 8/2015 | Yang | G06F 3/0619 |
| | | | 711/103 |
| 2016/0335195 A1* | 11/2016 | Kawamura | G06F 12/0246 |

* cited by examiner

| VOLTAGE | FIRST LIMIT VALUE | SECOND LIMIT VALUE |
|---|---|---|
| V1 | 1 | 1 |
| V2 | 2 | 1 |
| V4 | 3 | 2 |
| V5 | 4 | 2 |
| V7 | 5 | 3 |
| ⋮ | ⋮ | ⋮ | ically, to a memory system.

MEMORY SYSTEM INCLUDING A BATTERY POWERED BUFFER WITH A STORAGE CAPACITY OF THAT BUFFER DEPENDENT ON THE VOLTAGE LEVEL OF THE BATTERY

CROSS-REFERENCE TO RELATED APPLICATIONS

This application is based upon and claims the benefit of priority from U.S. Provisional Application No. 62/129,674, filed on Mar. 6, 2015; the entire contents of which are incorporated herein by reference.

FIELD

Embodiments described herein relate generally to a memory system.

BACKGROUND

There is conventionally a memory system that includes a volatile memory, a nonvolatile memory, and a battery, and uses the volatile memory as a cache or work area. Such a memory system uses energy stored in the battery to save, into the nonvolatile memory, necessary data in the volatile memory when the supply of electric power from the outside is cut off with no advance notice. The memory system starts charging the battery immediately after startup.

BRIEF DESCRIPTION OF THE DRAWINGS

FIG. 9 is a diagram illustrating a data configuration example of a limit value table.

DETAILED DESCRIPTION

In general, according to one embodiment, a memory system includes a nonvolatile memory, a buffer, a battery and a processing circuit. The battery stores energy supplied from the outside. The processing circuit, after start of the supply of energy from the outside, starts the acceptance of a request from the outside, starts a process in accordance with the accepted request, and restricts the amount of data in the buffer referring to a voltage of the battery. The process uses the buffer.

Exemplary embodiments of a memory system will be explained below in detail with reference to the accompanying drawings. The present invention is not limited to the following embodiments.

First Embodiment

Figure 1:
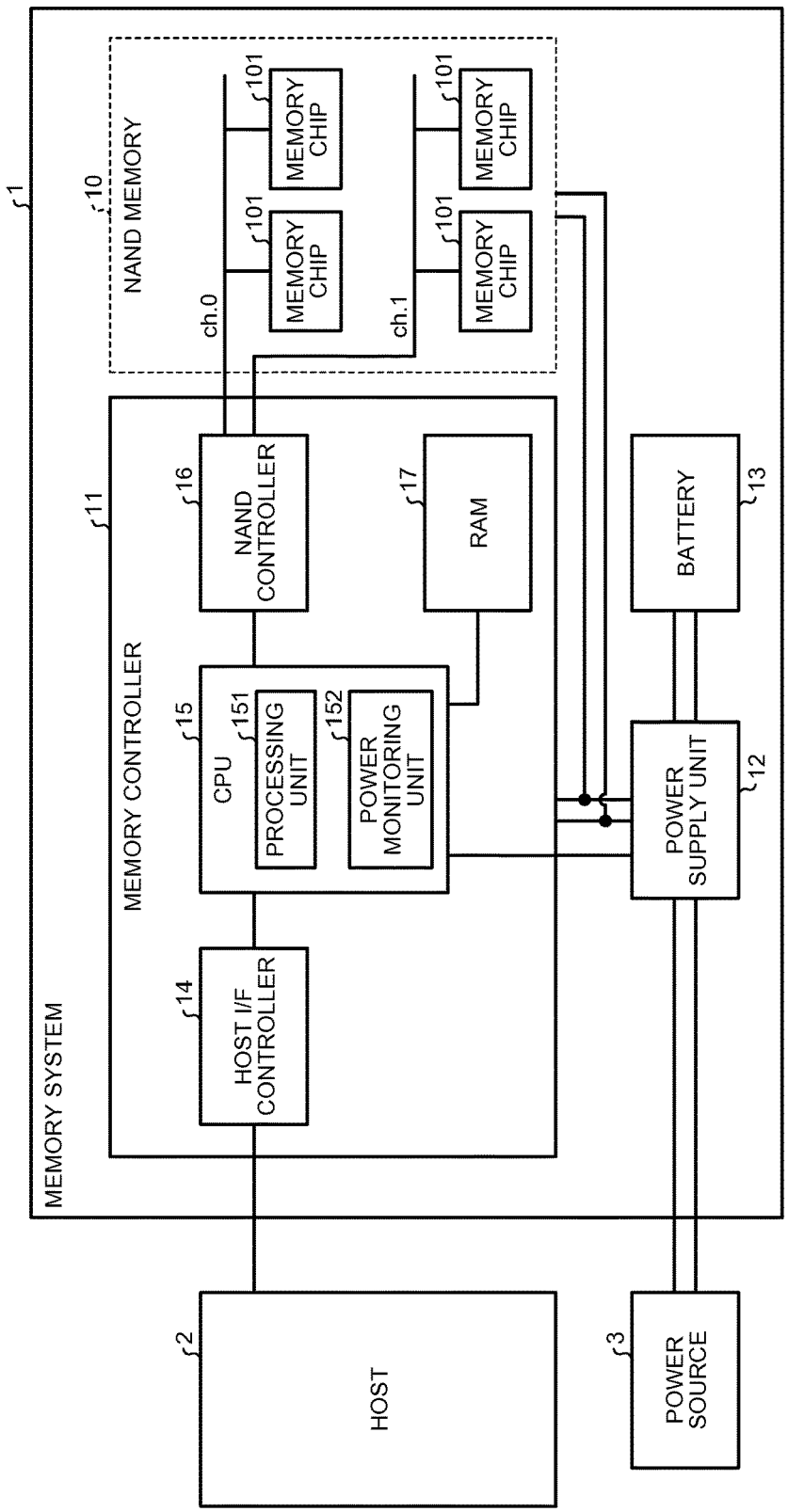
FIG. 1 is a diagram illustrating a configuration example of a memory system of a first embodiment.

FIG. 1 is a diagram illustrating a configuration example of a memory system of a first embodiment. A memory system 1 is connected to a host 2 via a connecting wire. Any interface standard can be adopted as an interface standard to which the connecting wire conforms. For example, the SCSI (Small Computer System Interface) standard, the SAS (Serial Attached SCSI) standard, the PCI Express standard, and the SATA (Serial ATA) standard can be adopted.

The host 2 corresponds to, for example, a personal computer, server, or CPU (Central Processing Unit). The memory system 1 is connected to an external power source 3, and is supplied with electric power by the power source 3. The memory system 1 uses the power from the power source 3 to operate. The memory system 1 functions as an external storage device of the host 2. The memory system 1 can accept access commands (a read command and a write command) from the host 2. After the write command, the memory system 1 subsequently accepts data to be written (write data). The access command includes logical address information (a logical address) indicating an access destination.

The memory system 1 includes a NAND flash memory (NAND memory) 10 and a memory controller 11 that transfers data between the host 2 and the NAND memory 10. The memory system 1 can include any type of nonvolatile memory instead of the NAND memory 10. For example, the memory system 1 can include a NOR flash memory instead of the NAND memory 10.

The memory system 1 further includes a power supply unit 12 and a battery 13. The power supply unit 12 supplies the power supplied from the power source 3, after conversion or as it is, to the NAND memory 10 and the memory controller 11. The memory controller 11 and the NAND memory 10 use the power supplied from the power supply unit 12 to operate.

The memory system 1 receives a power-off notice from the host 2 before power-off. When having received the power-off notice, a CPU 15 starts a power off sequence (hereinafter, the normal power off sequence). An event in which the supply of power is stopped without a power-off notice is expressed as power-down. The event in which the supply of power is stopped without a power-off notice is also expressed as "unexpected power loss", "surprise power loss", "dirty power loss", and "asynchronous power loss". The normal power off sequence and a power off sequence upon power-down may be different or the same.

For example, when the host 2 is shut down (or when it goes into sleep or hibernate mode), the host 2 sends a signal to the memory system 1 to indicate that the power is going to turn off. In SATA systems, a STANDBY IMMEDIATE command is commonly used. In SAS or SCSI systems, the proper command is included in the start-stop protocol. The memory system 1 starts the normal power off sequence in response to the command. The host 2 does not shut down until the command is sent and the memory system 1 acknowledges the command back to the host 2. The memory system 1 completes any unfinished writes and saves any updated management data before sending this acknowledge message.

The battery 13 is a rechargeable battery. The battery 13 stores therein energy used to execute the power off sequence upon power-down. When power is being supplied from the power source 3, the battery 13 is charged by the power supply unit 12. More specifically, immediately after startup, the power supply unit 12 starts supplying power to the NAND memory 10 and the memory controller 11 and starts charging the battery 13. "After A" indicates a timing later than the timing of A. "Immediately after A" indicates a timing immediately subsequent to the timing of A among timings later than the timing of A. In other words, "immediately after startup" indicates a timing immediately subsequent to the timing when power starts being supplied from the power source 3. Upon power-down, the power supply unit 12 switches a power supply source from the power source 3 to the battery 13, and the battery 13 supplies power to the NAND memory 10 and the memory controller 11 via the power supply unit 12. The memory system 1 can adopt any type of battery as the rechargeable battery. For example, an electrolytic capacitor or an electrical double layer capacitor can be adopted as the rechargeable battery.

The memory controller 11 includes a host interface controller (host I/F controller) 14, the CPU 15, a NAND controller 16, and a RAM (Random Access Memory) 17. The CPU 15 controls the entire memory controller 11 based on firmware. Especially, the CPU 15 functions as a processing unit 151 and a power monitoring unit 152. The functions of the processing unit 151 and the power monitoring unit 152 are described below. The host I/F controller 14 controls a communication interface in between with the host 2. Moreover, the host I/F controller 14 transfers data between the host 2 and the RAM 17 under control of the processing unit 151. The NAND controller 16 transfers data between the NAND memory 1 and the RAM 17 under control of the processing unit 151. The RAM 17 is configured of, for example, a DRAM (Dynamic Random Access Memory), an SRAM (Static Random Access Memory), or a combination thereof.

The NAND memory 10 is configured of one or more memory chips 101. Here, the NAND memory 10 includes four memory chips 101.

Figure 2:
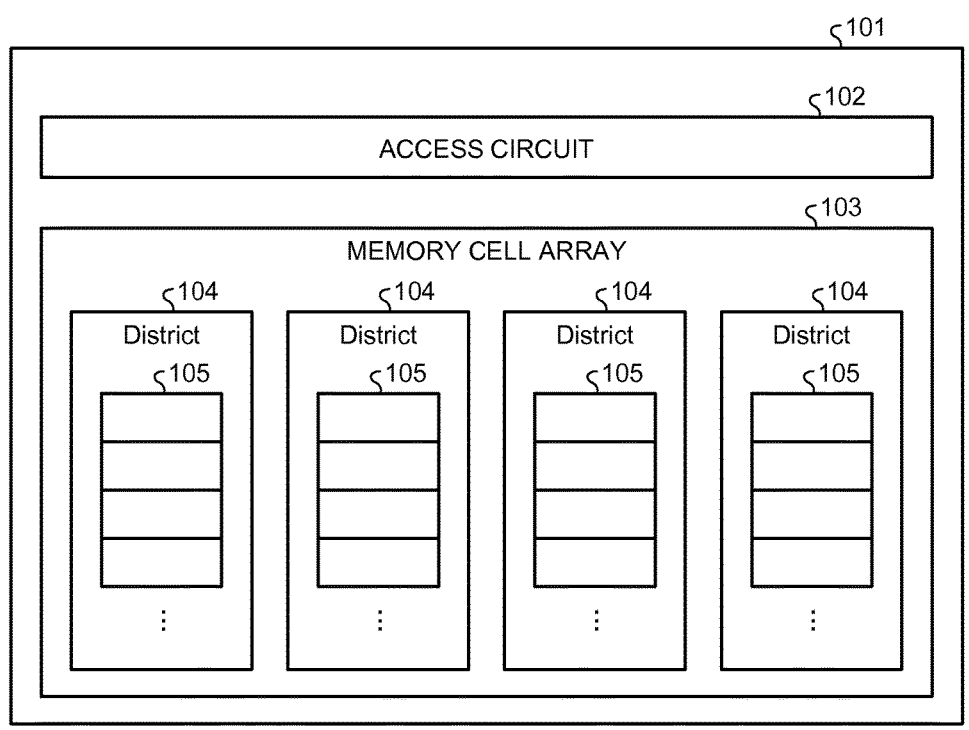
FIG. 2 is a diagram illustrating the configuration of one memory chip.

FIG. 2 is a diagram illustrating the configuration of one memory chip 101. The memory chip 101 includes an access circuit 102 and a memory cell array 103. The access circuit 102 includes a power generation circuit, a row decoder, a column decoder, a data cache, and a sense amplifier. The access circuit 102 can execute access (program, read, erase) to the memory cell array 103. The memory cell array 103 is divided into a plurality of (here, four) Districts 104 that can be accessed simultaneously by the access circuit 102. Each District 104 includes a plurality of blocks 105. The block 105 is a minimum unit of an erase operation.

Figure 3:
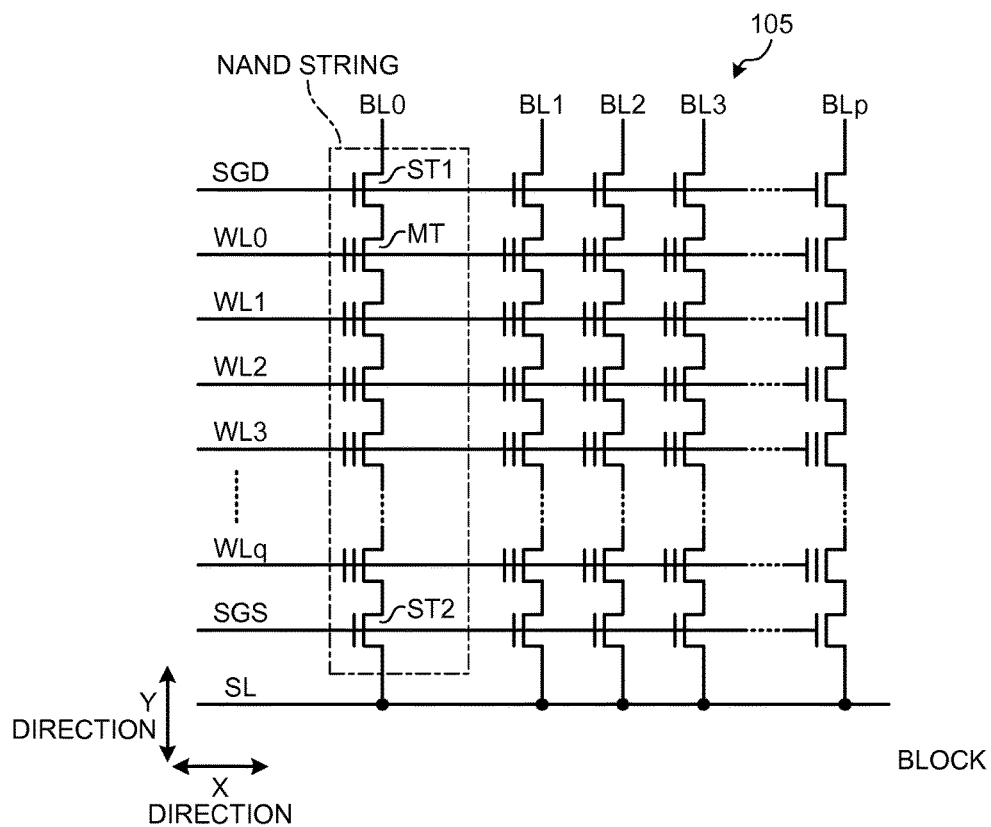
FIG. 3 is a diagram illustrating the configuration of one block.

FIG. 3 is a diagram illustrating the configuration of one block 105. As illustrated, the block 105 includes (p+1) NAND strings arranged in order along the X direction (p is an integer of zero or more). Drains of select transistors ST1 respectively included in the (p+1) NAND strings are connected to bit lines BL0 to BLp, and their gates are connected in common to a select gate line SGD. Moreover, sources of select transistors ST2 are connected in common to a source line SL, and their gates are connected in common to a select gate line SGS.

Each memory cell transistor MT (memory cell) is configured of a MOSFEST (Metal Oxide Semiconductor Field Effect Transistor) having a stacked gate structure formed on a semiconductor substrate. The stacked gate structure includes a Floating Gate formed on the semiconductor substrate with a tunnel oxide film interposed therebetween, and a control gate electrode formed on the Floating Gate with an inter-gate insulating film interposed therebetween. The memory cell transistor MT changes in threshold voltage in accordance with the number of electrons stored in the Floating Gate, and stores data therein in accordance with the difference in threshold voltage. In other words, the memory cell transistor MT holds, in the Floating Gate, charge in the amount in accordance with the data.

In each NAND string, (q+1) memory cell transistors MT are placed between a source of the select transistor ST1 and a drain of the select transistor ST2 in such a manner as to connect their current paths in series. The control gate electrodes are connected to word lines WL0 to WLq in order from the memory cell transistor MT closest to the drain side. Therefore, the drain of the memory cell transistor MT connected to the word line WL0 is connected to the source of the select transistor ST1. The source of the memory cell transistor MT connected to the word line WLq is connected to the drain of the select transistor ST2.

The word lines WL0 to WLq connect the control gate electrodes of the memory cell transistors MT in common between the NAND strings in the block 105. In other words, the control gate electrodes of the memory cell transistors MT in the same row in the block 105 are connected to the same word line WL. The (p+1) memory cell transistors MT connected to the same word line WL are treated as one page. Data is programmed and read on a page by page basis.

In a case where a storage method is adopted in which three or more values are stored in one memory cell transistor MT (multi-valued memory (MLC: Multi-Level Cell) method), one word line WL includes a plurality of pages. For example, according to a four valued memory method, one word line WL includes two pages. Out of the two pages included in one word line WL, a page to be programmed first is called a lower page. Out of the two pages included in one word line WL, a page to be programmed after the lower page is called an upper page. According to the four valued memory method, one of four valued data "xy" defined by upper page data "x" and lower page data "y" can be held in one memory cell transistor MT. For example, data "11", "01", "00", or "10" is assigned to the four valued data "xy" in the order of the amounts of charge stored in the Floating Gates. The data "11" is an erased state. The order of the amounts of charge associated with the data is not limited to the above. In a case of a method in which the data is associated with the amount of charge in such a manner as that the Hamming distance between adjacent data is one.

Upon programming, the access circuit 102 selects a word line targeted for programming and activates the selected word line. The access circuit 102 then selects and activates a bit line corresponding to the read column address. The access circuit 102 applies voltage to the selected bit line and programs data into a memory cell transistor MT located on a point of intersection of the selected word line and the selected bit line. Specifically, the access circuit 102 applies a programming pulse of a high voltage to the Floating Gate of the memory cell transistor MT via the word line WL until the threshold voltage reaches a target value in accordance with the data.

Upon reading, the access circuit 102 applies a read voltage to the word line WL to identify the data ("11", "01", "00", "10") stored in the memory cell transistor MT.

Upon an erase process, the access circuit 102 applies an erase voltage to the substrate of the memory cell array 103. The access circuit 102 then brings all the word lines WL of the block 105 into conduction at ground potential. In each memory cell transistor MT in the block 105, the charge stored in the Floating Gate is released. As a result, the state of each memory cell transistor MT in the block 105 transits to the erased state (in other words, the state where the data "11" is stored).

Figure 4:
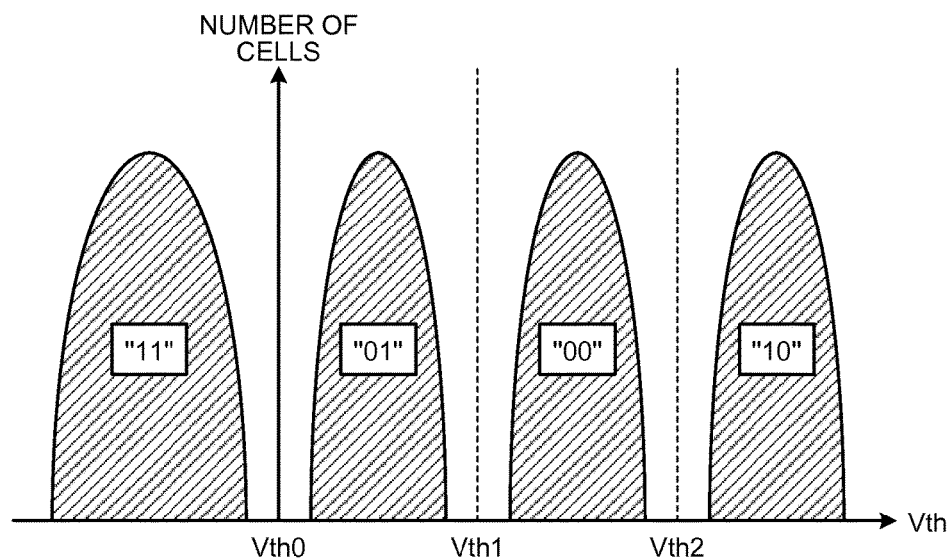
FIG. 4 is a diagram illustrating the relationship between the distribution of threshold values and the read voltage.

FIG. 4 is a diagram illustrating the relationship between the distribution of threshold values and the read voltage. The diagram illustrates the relationship in a case where the four valued memory method is adopted. The horizontal axis indicates the threshold voltage. The vertical axis indicates the number of memory cell transistors MT. As illustrated, a threshold value assigned to each data is actually distributed in an area with a constant width. Upon reading, an area to which the threshold value of the memory cell transistor MT belongs is determined based on a comparison between a read voltage set between the areas and the threshold voltage. For example, the access circuit 102 determines whether the upper page data is "1" or "0" based on whether or not the threshold voltage of the memory cell transistor MT exists between a read voltage Vth0 and a read voltage Vth2. In a case where the threshold voltage of the memory cell transistor MT exists between the read voltage Vth0 and the read voltage Vth2, the access circuit 102 determines that the upper page data is "0". In a case where the threshold voltage of the memory cell transistor MT does not exist between the read voltage Vth0 and the read voltage Vth2, the access circuit 102 determines that the upper page data is "1". Moreover, the access circuit 102 determines whether or not the lower page data is "1" or "0" based on whether the threshold voltage of the memory cell transistor MT is larger or smaller than a read voltage Vth1. In a case where the threshold voltage of the memory cell transistor MT is larger than the read voltage Vth1, the access circuit 102 determines that the lower page data is "0". In a case where the threshold voltage of the memory cell transistor MT is smaller than the read voltage Vth1, the access circuit 102 determines that the lower page data is "1".

Each of the four memory chips 101 configuring the NAND memory 10 is connected to the memory controller 10 via one of two channels (ch.0 and ch.1). Here, two memory chips 101 are connected to each channel. Each memory chip 101 is connected to only one of the two channels. Each channel is configured of a wire group including an I/O signal line and a control signal line. The I/O signal line is a signal line for transmitting and receiving data, addresses and commands. The bit width of the I/O signal line is not limited to one bit. The control signal line is a signal line for transmitting and receiving a WE signal (write enable) signal, a RE (read enable) signal, a CLE (command latch enable) signal, an ALE (address latch enable) signal, a WP (write protect) signal, and the like. The memory controller 10 can control the channels individually. The memory controller 10 can simultaneously operate two memory chips 101 connected to different channels by controlling the two channels simultaneously and individually.

Figure 5:
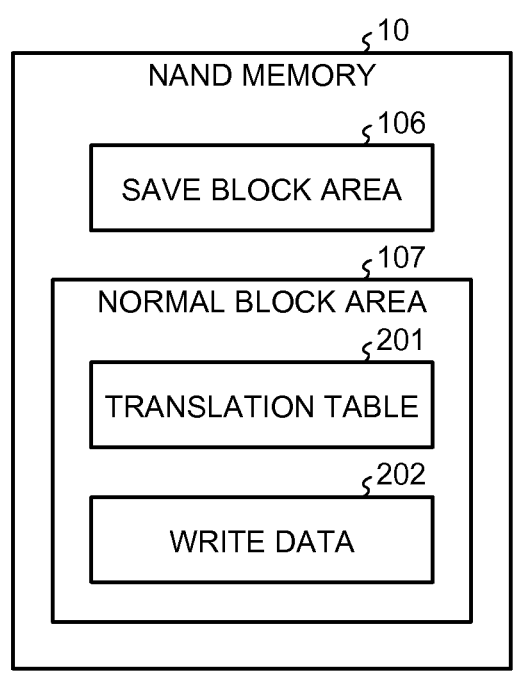
FIG. 5 is a diagram illustrating a memory structure example of a NAND memory.

FIG. 5 is a diagram illustrating a memory structure example of the NAND memory 10. A save block area 106 and a normal block area 107 are allocated by the memory controller 11 in the NAND memory 10. Each of the save block area 106 and the normal block area 107 is configured of one or more blocks 105. The save block area 106 is an area where data is saved from the RAM 17 in the power off sequence upon power-down. The area where data is saved from the RAM 17 in the power off sequence upon power-down may have a size smaller than one block 105. Data targeted to be saved is described below. The normal block area 107 is an area where a translation table 201 and write data 202 are stored.

The translation table 201 is a type of management data. The management data is data excluding write data. The management data includes intermediate data generated by the memory system 1 upon control over the memory system 1, and parameters required to control the memory system 1. The translation table 201 is information that associates a logical address with physical address information (a physical address) uniquely indicating a location (a memory cell transistor MT) in a storage area of the NAND memory 10. The translation table 201 includes a plurality of records. Each record associates, for example, a logical address assigned to a head location of a unit area of a predetermined size with a physical address indicating the head location. The unit area may or may not be a page.

Figure 6:
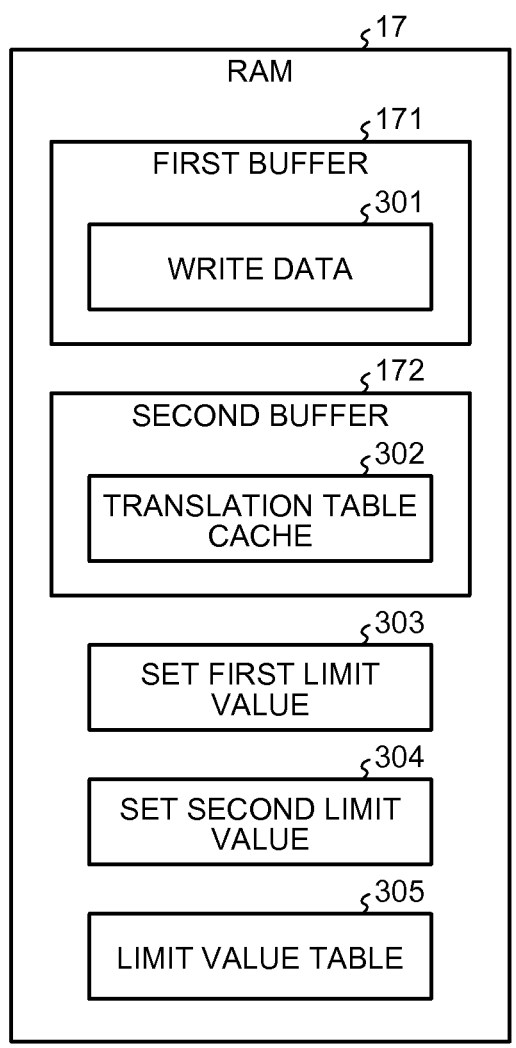
FIG. 6 is a diagram illustrating a memory structure example of a RAM.

FIG. 6 is a diagram illustrating a memory structure example of the RAM 17. A first buffer 171 and a second buffer 172 are allocated in the RAM 17.

The host I/F controller 14 stores write data from the host 2 in the first buffer 171 (write data 301). The write data 301 stored in the first buffer 171 is later stored by the NAND controller 16 in the normal block area 107 in the NAND memory 10 (write data 202). Specifically, the processing unit 151 first manages the write data 171 stored in the RAM 17 as dirty data. Dirty indicates a state of data that is not yet stored in a nonvolatile memory (here, the NAND memory 10) among data stored in a volatile memory (here, the RAM 17). The processing unit 151 stores the dirty write data 301 in the normal block area 107 by controlling the NAND controller 16.

The processing unit 151 caches, in the second buffer 172, part or all of the records configuring the translation table 201. The record group in the second buffer 172 is expressed as a translation table cache 302. The processing unit 151 refers to the translation table cache 302 upon reading into the NAND memory 10. Moreover, upon programming the NAND memory 10, the processing unit 151 updates a record of the translation table cache 302, or adds a record to the translation table cache 302. The processing unit 151 manages, as a dirty record, a changed record among the records configuring the translation table cache 172. Changing includes updating and adding. The processing unit 151 stores, in the normal block area 107, the dirty record of the translation table cache 172. Hereinafter, the process of storing dirty data or dirty records in the normal block area 107 from the buffer (the first buffer 171 or the second buffer 172) is expressed as the non-volatilization process.

The processing unit 151 executes a save process. The save process is the process of saving (storing), in the save block area 106, the dirty data in the first buffer 171 or the dirty records in the second buffer 172 in the power off sequence upon power-down. Moreover, the processing unit 151 executes a recovery process after startup. The recovery process is the process of reading, into the RAM 17, the dirty data and dirty records stored in the save block area 106 and storing, in the normal block area 107, the dirty data and dirty records read into the RAM 17. Hereinafter, when expressed as the dirty data in the RAM 17 or simply as the dirty data, the dirty data in the RAM 17 or the dirty data include dirty data in the first buffer 171 and a dirty record in the second buffer 172.

A set first limit value 303 and a set second limit value 304 are further stored in the RAM 17. A first limit value is an upper limit of the allowable amount of dirty data to be stored in the first buffer 171. The set first limit value 303 is a set value of the first limit value. A second limit value is an upper limit of the allowable amount of dirty records to be stored in the second buffer 172. The set second limit value 304 is a set value of the second limit value. As described above, the battery 13 starts being charged immediately after startup. The processing unit 151 controls the set first limit value 303 and the set second limit value 304 in accordance with the charge amount of the battery 13 to enable the dirty data in the RAM 17 to be fully saved in the save block area 106 even if power-down occurs before the battery 13 becomes fully charged. In accordance with the charge amount of the battery 13 here indicates in accordance with the voltage across the battery 13 (hereinafter simply the voltage of the battery 13). This is because the voltage of the battery 13 correlates with the charge amount of the battery 13. The processing unit 151 may compute the charge amount of the battery 13 based on information on the battery 13 (including the voltage of the battery 13). Moreover, the processing unit 151 may acquire the charge amount of the battery 13. Moreover, the processing unit 151 may use information other than the voltage of the battery 13 as an indicator indicating the charge amount of the battery 13.

Figure 7:
FIG. 7 is a graph illustrating the relationship between the charge amount and the amount of savable data.

FIG. 7 is a graph illustrating the relationship between the charge amount and the amount of savable data. The size of a minimum unit of write into the NAND memory 10 is a page size. Here, the save process is assumed to be executed by a unit of page. In terms of the unit of the save process, the save process may be executed by a unit of page group configured by gathering a plurality of pages. For example, a unit of the save process may be configured of four pages in the same memory chip 101, the four pages respectively belonging to different Districts 104. Moreover, a unit of the save process may be configured to be a plurality of pages including two pages each including a different memory chip 101.

In the graph of FIG. 7, the horizontal axis presents the charge amount, and the vertical axis presents the number of savable pages. The number of pages is a value obtained by dividing the data size by the page size. When the charge amount reaches E0, dirty data of a one-page size can be saved. E0 is the total energy of energy Est necessary to save the dirty data of the one-page size and energy to cause the memory controller 11 to maintain the minimum functions (for example, the function of a bus, and the function of the processing unit 151). When the charge amount of the battery 13 exceeds E0, the size of savable dirty data increments by one page whenever the charge amount of the battery 13 increases by Est.

Figure 8:
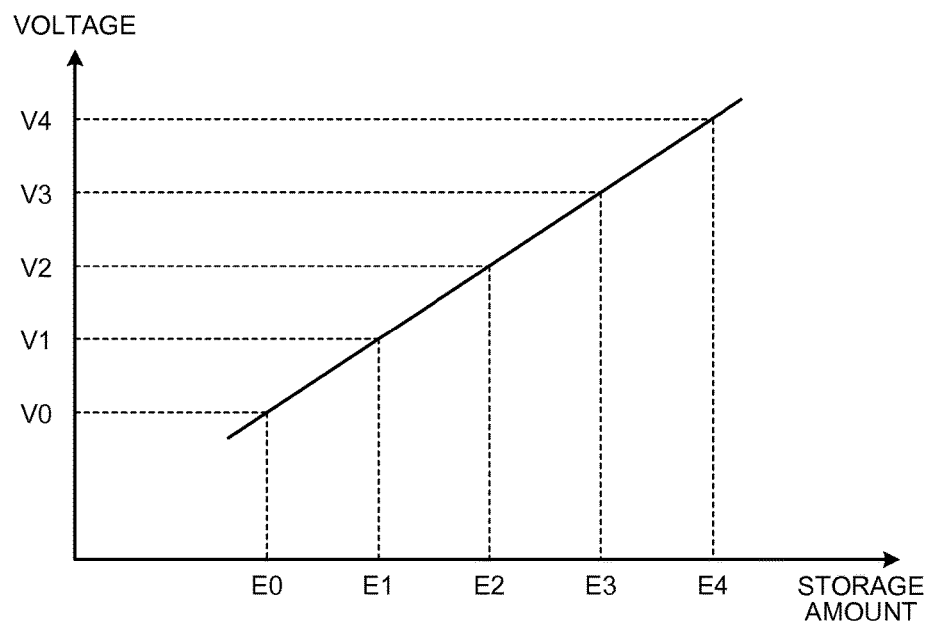
FIG. 8 is a graph illustrating an example of the relationship between the voltage of a battery and the charge amount of the battery.

FIG. 8 is a graph illustrating an example of the relationship between the voltage of the battery 13 and the charge amount of the battery 13. The voltage of the battery 13 and the charge amount of the battery 13 have a positive correlation. In the example of FIG. 8, the voltage of the battery 13 is substantially proportional to the charge amount of the battery 13.

The processing unit 151 computes the set first limit value 303 and the set second limit value 304 based on the voltage of the battery 13. The relationship between the voltage of the battery 13 and the limit values (the first and second limit values) is set in advance as a limit value table 305 in the memory system 1. Specifically, the limit value table 305 is stored in advance in, for example, the NAND memory 10. The processing unit 151 reads the limit value table 305 from the NAND memory 10 into the RAM 17 upon startup. The processing unit 151 acquires the voltage of the battery 13 and searches the limit value table 305 using the acquired voltage of the battery 13 as a search key.

FIG. 9 is a diagram illustrating a data configuration example of the limit value table 305. In the example of FIG. 9, the limit value table 305 is configured to be capable of searching for a limit value from the voltage of the battery 13. The first and second limit values are expressed by the number of pages in this case. The first and second limit values may be expressed by any indicator as long as it is an indicator corresponding to the size. The first and second limit values are determined in advance by a unit of voltage in such a manner as that the ratio of the first limit value to the second limit value corresponds to the ratio of the amount of write data programmed into the NAND memory 10 to the amount of dirty records generated in accordance with the programming of the write data. In the example of FIG. 9, the ratio of the first limit value to the second limit value is set to 2:1. However, the first and second limit values are respectively integers. In a case where one or both of the first and second limit values do not become an integer in order to maintain the ratio of the first limit value to the second limit value to 2:1, values less than an integer is rounded up (ceil). The limit value table 305 is configured in such a manner as that the sum of the first and second limit values does not exceed the number of savable pages in a case of any charge amount.

For example, a case where the voltage of the battery 13 is V1 is considered. In the case where the voltage of the battery 13 is V1, the charge amount of the battery 13 is E1 as illustrated in FIG. 8. In a case where the charge amount of the battery 13 is E1, the save process can be executed on data of a two-page size as illustrated in FIG. 7. Moreover, as illustrated in FIG. 9, in the case where the voltage of the battery 13 is V1, the first and second limit values are respectively set to "1". Accordingly, dirty write data and dirty records can be held in the RAM 17, respectively, with the size of one page as an upper limit. In other words, in the case where the voltage of the battery 13 is V1, the processing unit 151 can control the total size of dirty write data and dirty records in such a manner as to prevent the total size from exceeding two pages, which is the size that allows the save process at that point in time.

The actual charge amount of the battery 13 corresponding to the voltage of the battery 13 is considered to change due to various factors. For example, the capacity of the battery 13 generally becomes smaller as the temperature becomes lower. In other words, the capacity of the battery 13 may become smaller due to heat dissipation of the memory system 1 itself immediately after startup than during continuous operation. Moreover, the capacity of the battery 13 is reduced due to aging. Moreover, the capacity of the battery 13 may be different depending on the individual battery 13. Moreover, the measured value of the voltage of the battery 13 includes a measurement error. Each limit value is set in advance in the limit value table 305 considering a change in the actual charge amount of the battery 13 corresponding to the voltage of the battery 13. For example, each limit value is set in advance in the limit value table 305 to allow the save process on all dirty data in a smaller storage amount than the charge amount of the battery 13 estimated from the voltage of the battery 13 based on the relationship illustrated in FIG. 7. Moreover, the processing unit 151 may correct the measured value of the voltage of the battery 13 in accordance with, for example, temperature, elapsed time since the start of operation, information indicating an individual variation, or information indicating the level of a measured error. The processing unit 151 may search the limit value table 305 using the corrected measured value. In a case where the voltage of the battery 13 exceeds Vn (n=1, 2, . . . ) and is less than Vn+1, the processing unit 151 acquires each limit value corresponding to Vn from the limit value table 305.

The power monitoring unit 152 successively acquires the voltages of the battery 13. The power monitoring unit 152 then transmits the successively acquired voltages of the battery 13 to the processing unit 15. In FIG. 1, the illustration of hardware for measuring the voltage is omitted. The hardware includes an AD converter that converts, for example, a measured voltage value to a digital value. The hardware for measuring the voltage may be included inside or outside the memory controller 11. The power supply unit 12 issues a notice when switching the power supply source from the power source 3 to the battery 13. The power monitoring unit 152 catches the notice and transmits the caught notice to the processing unit 151.

Next, the operation of the memory system 1 of the first embodiment is described.

Figure 10:
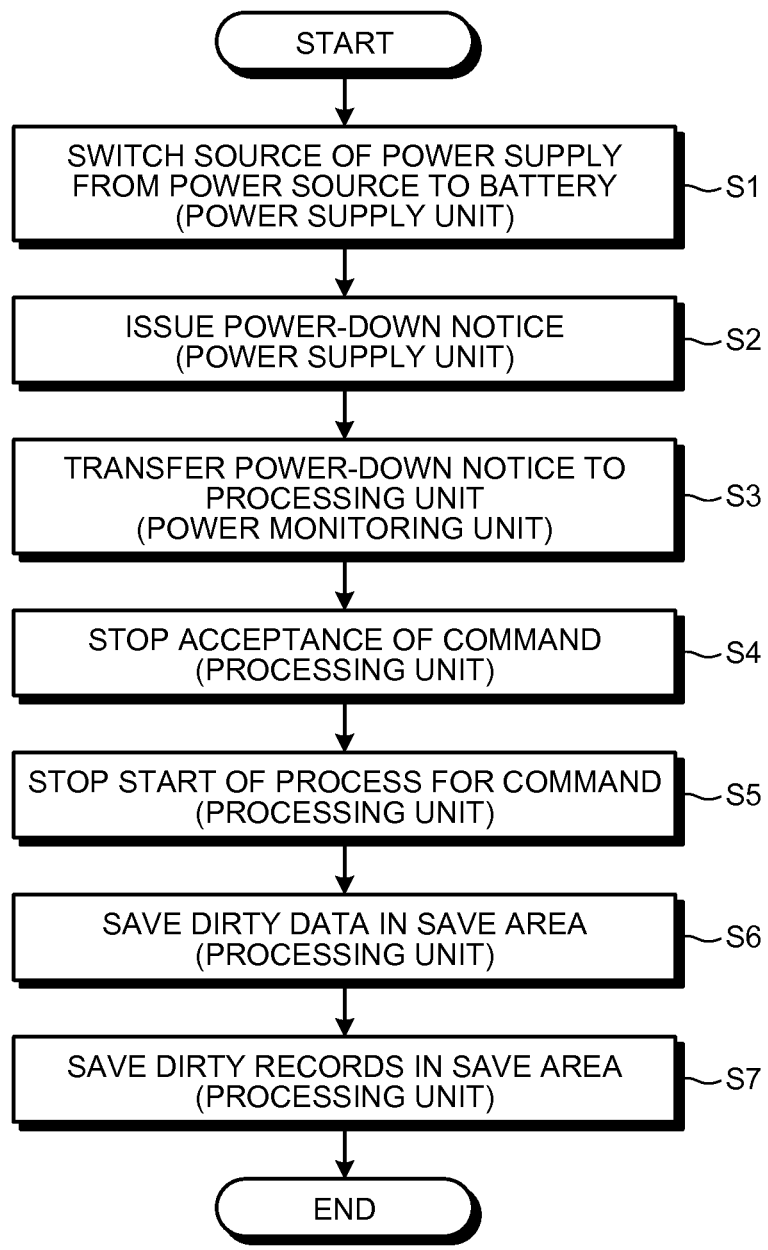
FIG. 10 is a flowchart illustrating a power off sequence upon power-down.

FIG. 10 is a flowchart illustrating the power off sequence upon power-down. When the voltage of the power source 3 drops below a predetermined value without receiving a power-off notice from the host 2, the power supply unit 12 recognizes power-down. When having recognized power-down, the power supply unit 12 transmits, to the CPU 15, a signal to stop a new write (including a background process). The signal is caught by the power monitoring unit 152 to be conveyed to the processing unit 151. The processing unit 151 stops the new write. Moreover, when having recognized power-down, the power supply unit 12 switches the source of power supply from the power source 3 to the battery 13 (S1). The power supply unit 12 then issues a power-down notice (S2). For the subsequent processes until the process of S7, the memory system 1 uses the energy stored in the battery 13 to operate.

The power monitoring unit 152 catches the notice and transfers the caught notice to the processing unit 151 (S3). When having received the notice, the processing unit 151 recognizes the occurrence of power-down. When having recognized the occurrence of power-down, the processing unit 151 stops the acceptance of a command from the host 2 (S4). Stopping the acceptance of a command from the host 2 indicates, for example, not accepting a request of the host 2 and not responding to an already accepted request of the host 2. Following the process of S4, the processing unit 151 stops the start of a process for an unexecuted command being the already accepted command of the host 2 (S5).

In a case where a process is being executed on the NAND memory 10 at the point of S5, the processing unit 151 may stop the process during execution halfway, or continue the execution until the execution of the command during execution is complete. For example, if programming into an upper page is interrupted, data already written into a lower page is lost. In a case where the write of data into the NAND memory 10, the programming destination of which is an upper page, is being executed at the point of S5, the processing unit 151 continues the write of the data. Moreover, for example, in a case where the read of data from the NAND memory 10 is being executed at the point of S5, the processing unit 151 ends the read halfway.

Next, the processing unit 151 executes the save process in S6 and S7. Specifically, the processing unit 151 saves the dirty write data 301 in the save block area 106 (S6). The processing unit 151 then saves the dirty records in the save block area 106 (S7). The processing unit 151 ends the power off sequence after the completion of the save process.

Figure 11:
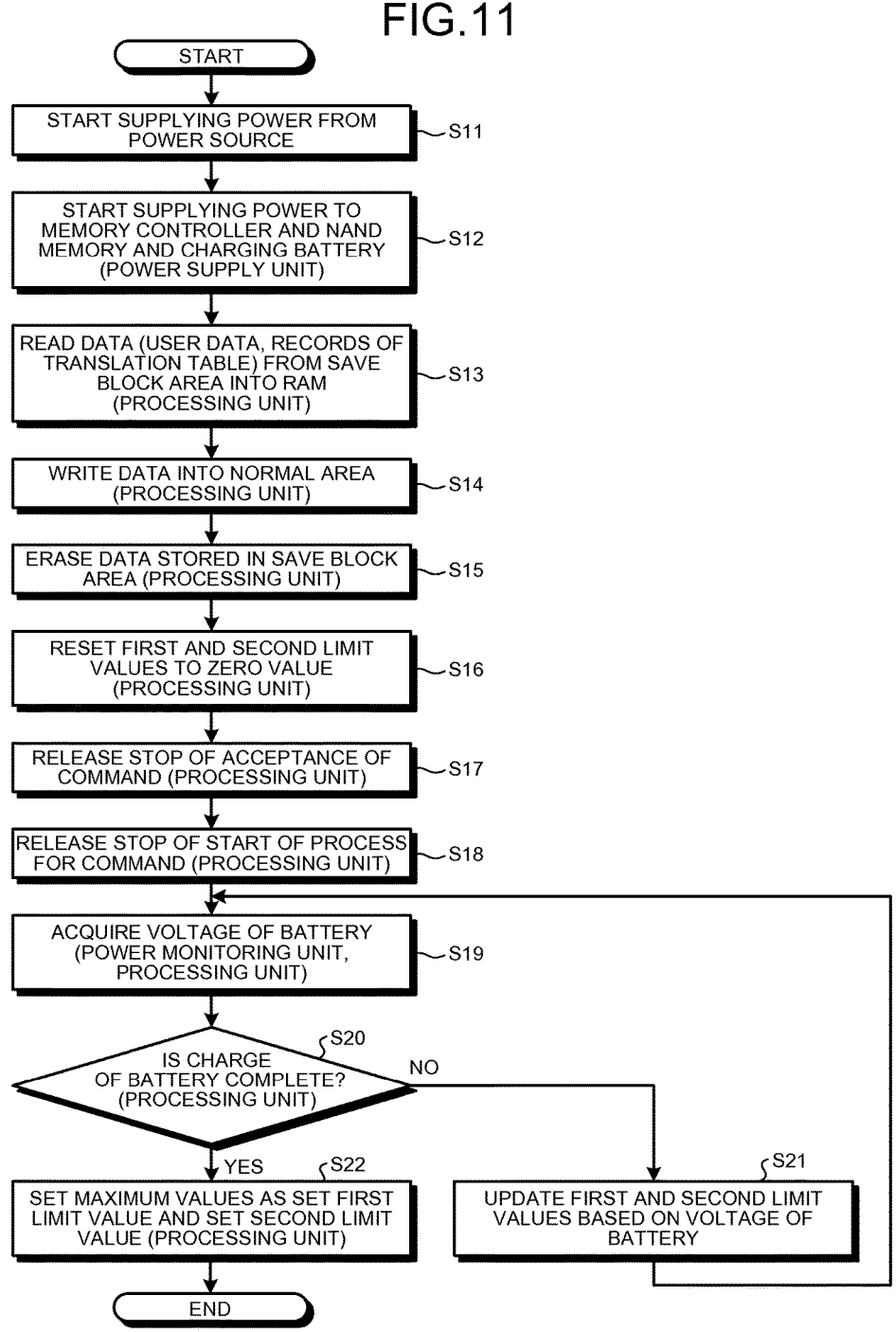
FIG. 11 is a flowchart illustrating processes after startup.

FIG. 11 is a flowchart illustrating processes after startup. Firstly, power starts being supplied from the power source 3 (S11). The power supply unit 12, which has been supplied with the power from the power source 3, starts supplying the power to the NAND memory 10 and the memory controller 11 and charging the battery 13 (S12). In the memory controller 11, the CPU 15 starts the functions as the processing unit 151 and the power monitoring unit 152 based on the firmware. The power monitoring unit 152 starts monitoring the voltage of the battery 13. Monitoring the voltage indicates acquiring the voltage in real time (at intervals of a predetermined sufficiently short time). The charge amount of the battery 13 increases with the passage of time after the process of S12 until the battery 13 becomes fully charged. The voltage of the battery 13 increases in accordance with increasing of the charge amount of the battery 13.

After the process of S12, the processing unit 151 executes the recovery process in S13 to S15. In the recovery process, the processing unit 151 does not control the limit values in accordance with the storage amount. In other words, in the recovery process, the processing unit 151 uses the RAM 17 (the first buffer 171 and the second buffer 172) regardless of the charge amount of the battery 13.

In the recovery process, the processing unit 151 reads the data (write data and records of the translation table) saved by the save process from the save block area 106 into the RAM 17 (the first buffer 171 and the second buffer 172) (S13). The processing unit 151 then stores the data read into the RAM 17 in the normal block area 107 (S14). The processing unit 151 then empties the save block area 106 (S15). In S15, the processing unit 151 may erase the data stored in the save block area 106. Moreover, in S15, the processing unit 151 may invalidate the data stored in the save block area 106 and allocate another empty block as the save block area 106. Empty indicates the state of storing no valid and invalid data.

The reason that the limit values are not controlled in accordance with the charge amount upon the recovery process is because even if power-down occurs during the recovery process and the data read into the RAM 17 is lost, the data can be read again from the save block area 106 upon the next startup.

After the recovery process, the processing unit 151 resets the set first limit value 303 and the set second limit value 304 to a zero value (S16). The processing unit 151 then releases the stop of the acceptance of a command (S17), and releases the stop of the start of a process for a command (S18).

The processing unit 151 acquires the voltage of the battery 13 via the power monitoring unit 152 (S19). The processing unit 151 then determines whether or not the charge of the battery 13 is complete (S20). In a case, for example, where the voltage of the battery 13 reaches a value corresponding to the full charge, the processing unit 151 determines that the charge of the battery 13 is complete. In a case where the charge of the battery 13 is not complete (S20, No), the processing unit 151 updates the set first limit value 303 and the set second limit value 304 based on the voltage of the battery 13 acquired by the process of S19 (S21). Specifically, the processing unit 151 searches the limit value table 305 with the voltage of the battery 13 acquired by the process of S19 as the search key. The processing unit 151 acquires the first and second limit values by the search. The processing unit 151 updates the set first limit value 303 with the acquired first limit value. The processing unit 151 updates the set second limit value 304 with the acquired second limit value.

After the process of S21, the processing unit 151 reexecutes the process of S19. The processing unit 151 repeats the loop process of S19 to S21 in a period of transition until the battery 13 becomes fully charged. The set first limit value 303 and the set second limit value 304 are controlled by the loop process in accordance with the charge amount.

In a case where the charge of the battery 13 is complete (S20, Yes), the processing unit 151 sets the maximum value of the first limit value as the set first limit value 303, and sets the maximum value of the second limit value as the set second limit value 304 (S22). Then the process upon startup ends. The maximum value of the first limit value is an upper limit of the amount of allowable dirty data to be stored in the first buffer 171 when the battery 13 is fully charged. Moreover, the maximum value of the second limit value is an upper limit of the amount of allowable dirty records to be stored in the second buffer 172 when the battery 13 is fully charged. The processing unit 151 may acquire the maximum values of the first and second limit values from the limit value table 305.

Figure 12:
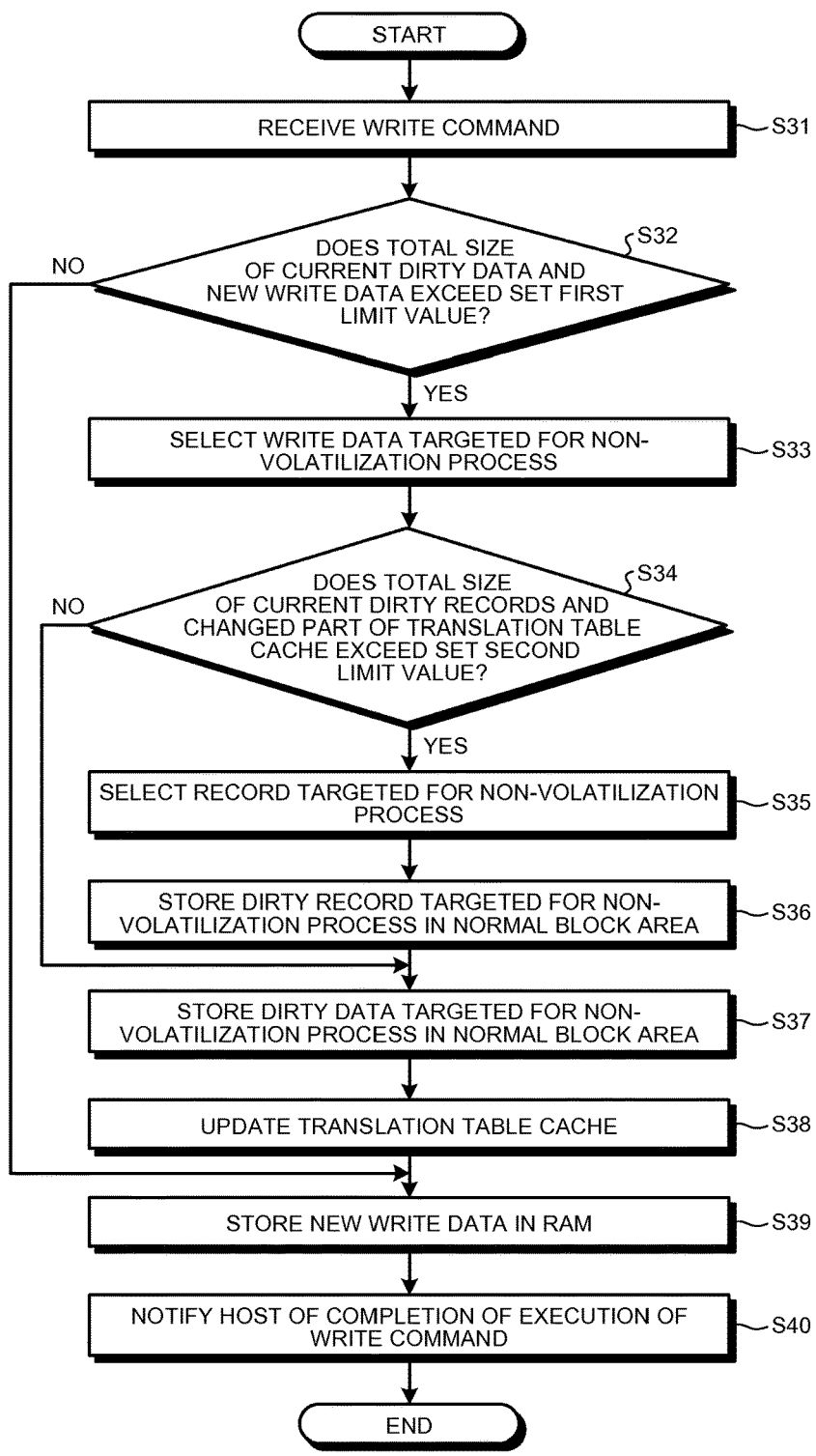
FIG. 12 is a flowchart illustrating operations in accordance with a write command.

After the stop of the acceptance of a command and the stop of the start of a process for a command are released (in other words, after the processes of S18 and S19), the processing unit 151 becomes possible to accept and execute a command. FIG. 12 is a flowchart illustrating operations in accordance with a write command.

When the processing unit 151 has received a write command at the host I/F controller 14 (S31), the processing unit 151 determines whether or not the total size of the dirty write data 301 stored in the first buffer 171 (expressed as the current dirty data) and write data to be written by the write command received in the process of S31 (expressed as the new write data) exceeds the set first limit value 303 (S32).

In a case where the total size of the current dirty data and the new write data exceeds the set first limit value 303 (S32, Yes), the processing unit 151 sets part or all of the current dirty data as a target of the non-volatilization process (S33). Any of the current dirty data can be targeted for the non-volatilization process. For example, the processing unit 151 sets the oldest write data 301 among the dirty write data 301 stored in the first buffer 171 as the target of the non-volatilization process. The size of the target of the non-volatilization process set by the process of S33 is larger than a value obtained by subtracting the set first limit value 303 from the total size of the current dirty data and the new write data.

Following the process of S33, the processing unit 151 determines whether or not the total size of the dirty records stored in the second buffer 172 (expressed as the current dirty records) and a changed part of the translation table cache 302 exceeds the set second limit value 304 (S34). The changed part of the translation table cache 302 is a record updated or added in the translation table cache 302 by writing, into the NAND memory 10, the dirty data set as the target of the non-volatilization process. In a case where the total size of the current dirty records and the changed part of the translation table cache 302 exceeds the set second limit value 304 (S34, Yes), the processing unit 151 sets part or all of the current dirty records as the target of the non-volatilization process (S35). Any of the current dirty records can be targeted for the non-volatilization process. For example, the processing unit 151 sets the oldest dirty record among the dirty records stored in the second buffer 172, as the target of the non-volatilization process. The size of the target of the non-volatilization process set by the process of S35 is larger than a value obtained by subtracting the set second limit value 304 from the total size of the current dirty records and the size of the changed part of the translation table cache 302.

The processing unit 151 stores, in the normal block area 107, the dirty record set as the target of the non-volatilization process among the current dirty records (S36). The processing unit 151 manages, as a record that is not dirty, the record stored in the normal block area 107 among the current dirty records.

In a case where the total size of the current dirty records and the changed part of the translation table cache 302 does not exceed the set second limit value 304 (S34, No), or after the process of S36, the processing unit 151 stores, in the normal block area 107, the dirty data set by the process of S33 as the target of the non-volatilization process (S37). The processing unit 151 manages, as write data 301 that are not dirty, the write data 301 stored in the normal block area 107 among the current dirty data. The processing unit 151 may delete, from the first buffer 171, the write data 301 that is no longer dirty due to the process of S37.

The processing unit 151 updates the translation table cache 302, by the process of S37, in accordance with the storage of the write data 301 in the normal block area 107 (S38). Updating the translation table cache 302 indicates updating a record of the translation table cache 302 or adding a record to the translation table cache 302.

In a case where the total size of the current dirty data and the new write data does not exceed the set first limit value 303 (S32, No), or after the process of S38, the processing unit 151 receives the new write data from the host 2 and stores the received new write data in the first buffer 171 (S39). After the process of S39, the processing unit 151 notifies the host 2 of the completion of execution of the write command (S40), and ends the process in accordance with the write command.

In this manner, after power starts being supplied from the outside, the processing unit 151 starts the acceptance of a command, and starts a process in accordance with the accepted command, the process using the buffers (the first buffer 171 and the second buffer 172). After power starts being supplied from the outside includes at least between the timing immediately after the timing when the power starts being supplied from the outside and the timing when the battery 13 becomes fully charged. After power has started being supplied from the outside, the processing unit 151 restricts the amount of the dirty data (dirty write data 301 or dirty records) in the buffer during execution of the process in accordance with the accepted command, in accordance with the voltage of the battery 13. Consequently, even if power-down occurs before the battery 13 becomes fully charged, the processing unit 151 can save all the dirty data at that point in the NAND memory 10. Accordingly, the processing unit 151 can start the process for the command before the battery 13 becomes fully charged.

Moreover, in a case where the dirty records are expected to exceed the set second limit value 304 upon acceptance of new write data, the processing unit 151 executes the non-volatilization process on the current dirty record before the acceptance of the new write data. In other words, the processing unit 151 executes the non-volatilization process on the dirty record to prevent the amount of dirty records from exceeding the set second limit value 304.

Moreover, the processing unit 151 restricts the acceptance of new write data until the completion of the non-volatilization process on the dirty write data 301. In other words, the processing unit 151 controls the reception of new write data in such a manner as to prevent the amount of the dirty data in the buffer from exceeding the limit value in accordance with the voltage of the battery 13.

Moreover, in a case where the amount of the dirty write data 301 is expected to exceed the set first limit value 303 upon acceptance of new write data, the processing unit 151 executes the non-volatilization process on the current dirty write data 301 before the acceptance of the new write data. In other words, the processing unit 151 executes the non-volatilization process on the dirty write data 301 to prevent the amount of the dirty write data 301 from exceeding the set first limit value 303.

Moreover, the processing unit 151 restricts the acceptance of new write data until the completion of execution of the non-volatilization process on a dirty record. In other words, the processing unit 151 controls the reception of new write data to prevent the amount of dirty data in the buffer from exceeding the limit value in accordance with the voltage of the battery 13.

The processing unit 151 executes garbage collection. The processing unit 151 may start garbage collection before the battery 13 becomes fully charged. Garbage collection is the process of generating an empty block 105. Specifically, garbage collection is executed, for example, as follows: In other words, the processing unit 151 copies at least valid data stored in one block 105 (a block 105 targeted for garbage collection) into another block 105 via the RAM 17. The processing unit 151 then invalidates all data stored in the one block 105. The erase process is executed on the block 105 where all the data stored therein have been invalidated by garbage collection, and the block 105 is subsequently managed by the processing unit 151 as an empty block 105. The processing unit 151 may be configured in such a manner as that the amount of data read into the RAM 17 as part of garbage collection is not restricted by the limit values. This is because that the data read into the RAM 17 as part of garbage collection can be acquired from a garbage collection target block 105 even if the data is lost from the RAM 17 due to power-down. Garbage collection involves the update of the translation table cache 302. The processing unit 151 executes garbage collection while generating a dirty record in the second buffer 172.

It has been described in the above description that the relationship between the first and second limit values and the voltage of the battery 13 is specified in advance by the limit value table 305. However, the first and second limit values and the voltage of the battery 13 may be specified by information (for example, a function) other than the table. Moreover, the ratio of the first limit value to the second limit value has been described to be fixed. It may be configured that the total value of the first and second limit values is associated in advance with the voltage, the processing unit 151 measures the ratio of the amount of write data programmed into the NAND memory 10 and the amount of dirty records generated in accordance with the programming of the write data, and the total value in accordance with the voltage is distributed to the first and second limit values based on the measured ratio.

Moreover, the processing unit 151 and the power monitoring unit 152 have been described to be realized by the CPU 15 executing firmware. The processing unit 151 may be configured of a hardware circuit or a combination of a hardware circuit and firmware. Similarly, the power monitoring unit 152 may be configured of a hardware circuit or a combination of a hardware circuit and firmware. Moreover, part or all of the functions of the processing unit 151 may be realized by the power monitoring unit 152. Moreover, part or all of the functions of the power monitoring unit 152 may be realized by the processing unit 151.

Second Embodiment

Figure 13:
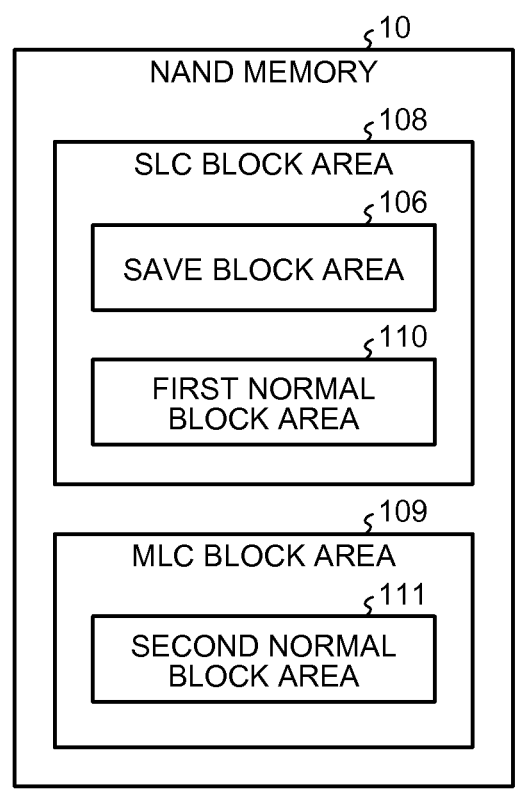
FIG. 13 is a diagram illustrating a memory structure example of a second embodiment of the NAND memory.

FIG. 13 is a diagram illustrating a memory structure example of a second embodiment of the NAND memory 10. In the second embodiment, the NAND memory 10 can operate in the MLC method and the two valued memory (SLC: Single-Level Cell) method. As illustrated in the diagram, an SLC block area 108 and an MLC block area 109 are allocated by the memory controller 11 in the NAND memory 10. Each of the SLC block area 108 and the MLC block area 109 is configured of one or more blocks 105. The SLC block area 108 is programmed in SLC mode. Whether each block 105 belongs to the SLC block area 108 or the MLC block area 109 may be decided fixedly in advance or may be changed dynamically by the processing unit 151. The MLC block area 109 is programmed in MLC mode. SLC mode is a mode in which data is programmed in the SLC method. MLC mode is a mode in which data is programmed in the MLC method. The programming of data is complete at higher speeds in a case where the data is programmed in the SLC method than in a case where the data is programmed in the MLC method. Moreover, the reliability of the programmed data is higher in the case where the data is programmed in the SLC method than in the case where the data is programmed in the MLC method.

The SLC block area 108 is used as the save block area 106 and a first normal block area 110. Moreover, the MLC block area 109 is used as a second normal block area 111. In the save process, the processing unit 151 saves the dirty data in the first buffer 171 and the dirty records in the second buffer 172 in the save block area 106 allocated in the SLC block area 108.

The processing unit 151 stores a target of the non-volatilization process in the first normal block area 110 before the battery 13 becomes fully charged. Moreover, the processing unit 151 stores a target of the non-volatilization process in the second normal block area 111 after the battery 13 becomes fully charged.

Moreover, in terms of the time required for programming, it takes longer to complete the programming in the case where the data is programmed in MLC mode than in the case where the data is programmed in SLC mode. The processing unit 151 may be configured to prevent the programming of data from being interrupted upon power-down. When power-down occurs before the battery 13 becomes fully charged, the processing unit 151 can start the save process earlier in the case where the data is programmed in SLC mode than in the case where the data is programmed in MLC mode.

Here, it has been described that the processing unit 151 switches to programming data in SLC mode or programming data in MLC mode based on whether or not the battery 13 has become fully charged. The processing unit 151 can determine whether or not the battery 13 is fully charged based on whether or not the voltage of the battery 13 has reached a value corresponding to the full charge. The processing unit 151 may switch the mode of the programming of data based on whether or not the voltage of the battery 13 has reached a value smaller than a value in a case where the battery 13 is fully charged.

Moreover, it has been described that the processing unit 151 programs data in SLC mode in the case where the battery 13 has not become fully charged, and programs data in MLC mode in the case where the battery 13 has become fully charged. The processing unit 151 may be configured to program data in a mode where a storage capacity per memory cell transistor MT is smaller in the case where the battery 13 has not become fully charged than in the case where the battery 13 has become fully charged. For example, the processing unit 151 programs data in a mode where a storage capacity per memory cell transistor MT is two bits in the case where the battery 13 has not become fully charged, and programs data in a mode where a storage capacity per memory cell transistor MT is three bits in the case where the battery 13 has become fully charged.

The processing unit 151 may start garbage collection before the battery 13 becomes fully charged. The processing unit 151 may use the second normal block area 111 as a copy destination of data by garbage collection in a case where garbage collection is started before the battery 13 becomes fully charged. The processing unit 151 may stop programming halfway regardless of whether the programming destination is an upper or lower page in the case where power-down occurs during the programming of data into the second normal block area 111 as part of garbage collection. This is because the data targeted to be copied by garbage collection is not erased from a block 105 targeted for garbage collection until the completion of garbage collection.

Third Embodiment

The processing unit 151 may change the number of operating channels before and after the battery 13 becomes fully charged.

Figure 14:
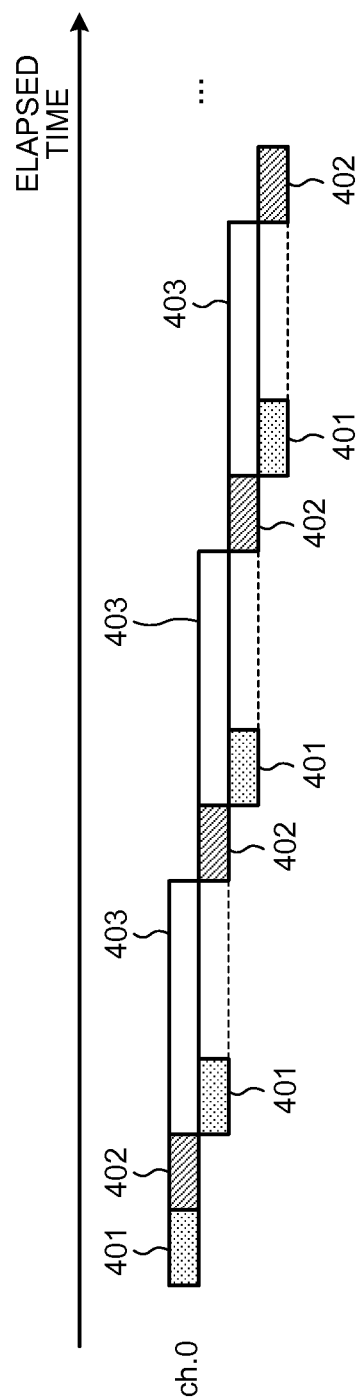
FIG. 14 is a timing chart illustrating communications on each channel before the battery becomes fully charged.
Figure 15:
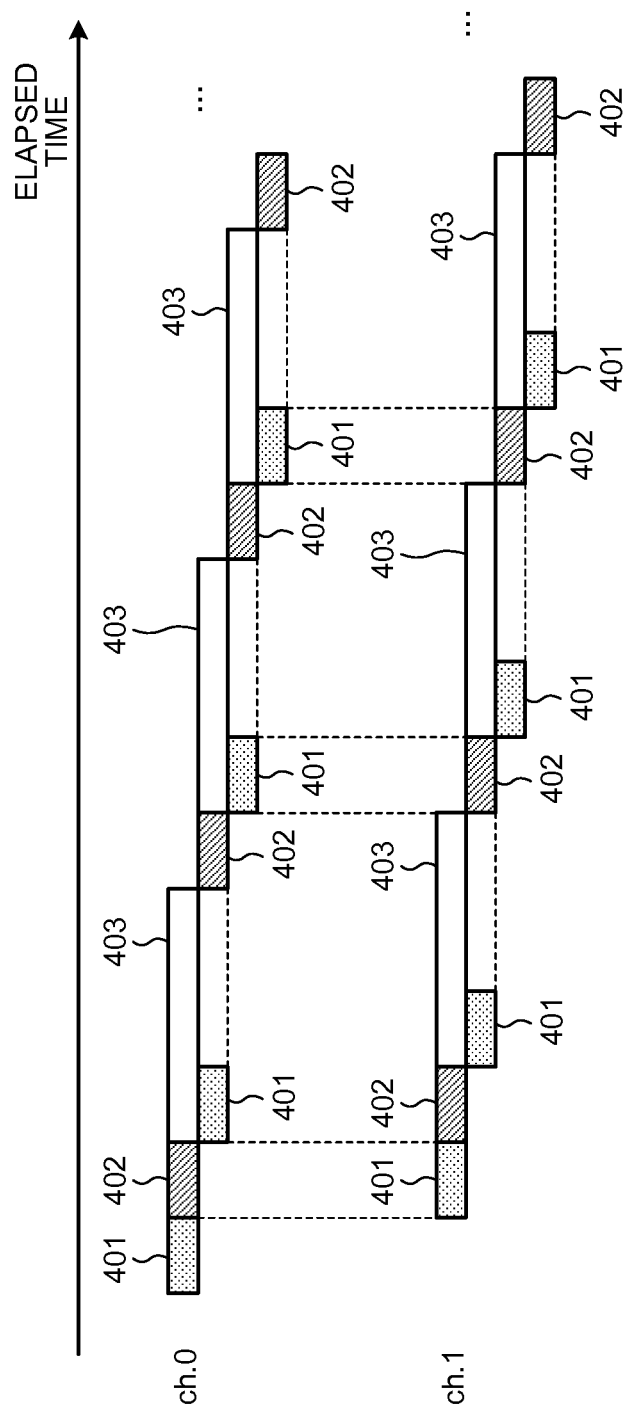
FIG. 15 is a timing chart illustrating communications on each channel after the battery becomes fully charged.

FIG. 14 is a timing chart illustrating communications on each channel before the battery 13 becomes fully charged. FIG. 15 is a timing chart illustrating communications on each channel after the battery 13 becomes fully charged. In order to facilitate the description, FIGS. 14 and 15 depict a period of data transfer from the host 2 to the first buffer 171 (data transfer 401). Data transfer 402 indicates a period of data transfer from the first buffer 171 to the memory chip 101. Programming 403 indicates a period during which in the memory chip 101 the access circuit 102 programs, into the memory cell array 103, data received from the memory controller 11 in the data transfer 402.

The processing unit 151 operates ch.0 and does not operate ch.1 before the battery 13 becomes fully charged. The processing unit 151 executes the data transfer 401 in the middle of performing the data transfer 402 and the programming 403 for one memory chip 101 connected to ch.0.

The processing unit 151 operates ch.0 and ch.1 after the battery 13 becomes fully charged. Different I/O signal lines are respectively used for ch.0 and ch.1. Hence, the data transfer 402 or the programming 403 can be processed in one of ch.0 and ch.1 in the middle of processing the data transfer 402 or the programming 403 in the other of ch.0 and ch.1.

The processing unit 151 may operate ch.1 instead of ch.0 before the battery 13 becomes fully charged. Moreover, in a case where the memory system 1 has three or more channels, the processing unit 151 operates as follows: In other words, the processing unit 151 operates one of any two of the three channels and does not operate the other before the battery 13 becomes fully charged. The processing unit 151 operates both of the two channels after the battery 13 becomes fully charged.

As in the second embodiment, the processing unit 151 may change the number of operating channels based on whether or not the voltage of the battery 13 has reached a value smaller than a value in a case where the battery 13 is fully charged.

The amount of data to be transferred in one data transfer 402 (in other words, the amount of data to be programmed by one programming 403) may be equal to a one-page size or may be equal to a plurality-of-pages size. In a case where data of a plurality of pages is transferred in the data transfer 402, the pages are respectively programmed in parallel into different Districts 104 in the programming 403.

The processing unit 151 may change the amount of data to be transferred in one data transfer 402 based on whether or not the battery 13 has become fully charged. The processing unit 151 reduces the amount of data to be transferred by one data transfer 402 before the battery 13 becomes fully charged as compared to after the battery 13 becomes fully charged. In other words, the processing unit 151 reduces the size of a minimum unit of write into the NAND memory 10 before the battery 13 becomes fully charged as compared to after the battery 13 becomes fully charged. For example, the processing unit 151 transfers data of a one-page size in one data transfer 402 before the battery 13 becomes fully charged. The processing unit 151 then transfers data of a four-page size in one data transfer 402 after the battery 13 becomes fully charged. As the size of the minimum unit of write into the NAND memory 10 becomes smaller, the increments of the limit value can be made smaller. Therefore, as the size of the minimum unit of write into the NAND memory 10 becomes smaller, the timing when it becomes possible to store write data in the first buffer 171 after startup becomes earlier.

Fourth Embodiment

Figure 16:
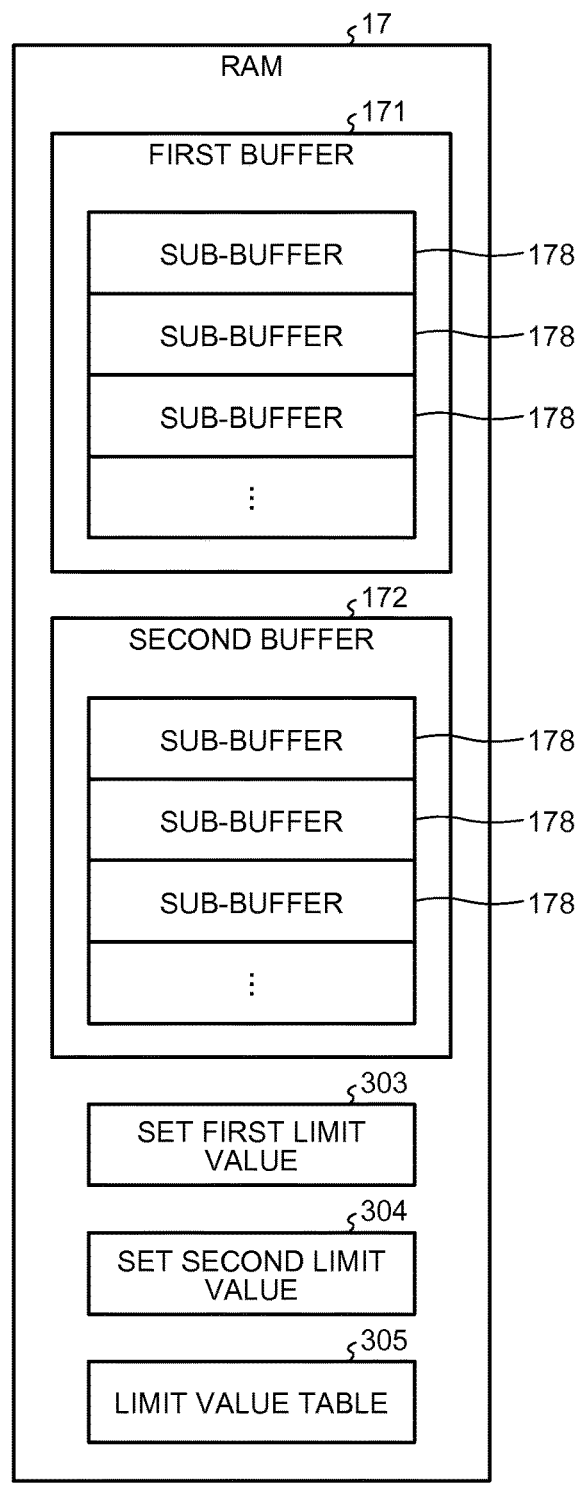
FIG. 16 is a diagram illustrating a memory structure example of a fourth embodiment of the RAM.

FIG. 16 is a diagram illustrating a memory structure example of a fourth embodiment of the RAM 17. As illustrated, in the fourth embodiment, the RAM 17 includes a plurality of sub-buffers 178 that can shut off the supply of power individually. The first buffer 171 and the second buffer 172 are configured of the plurality of sub-buffers 178. In a case where the RAM 17 is configured of a DRAM, for example, a PASR (Partial Array Self Refresh) function can be adopted. Moreover, in a case where the RAM 17 is configured of an SRAM, the SRAM is configured to be able to individually shut off the power to be supplied to each sub-buffer 178 by a logical circuit around each sub-buffer 178.

In a case where the plurality of sub-buffers 178 include sub-buffers 178 in which both of the write data 301 and the translation table cache 302 are not stored (hereinafter, the unused sub-buffers 178), the processing unit 151 shuts off the supply of the power to the unused sub-buffers 178. In a case where one of the unused sub-buffers 178 becomes required with increasing limit value (the set first limit value 303 or the set second limit value 304), the processing unit 151 releases the shut-off of the supply of the power to the one sub-buffer 178. Moreover, the processing unit 151 may shut off the supply of the power to the unused sub-buffers 178 in the power off sequence upon power-down.

Fifth Embodiment

Figure 17:
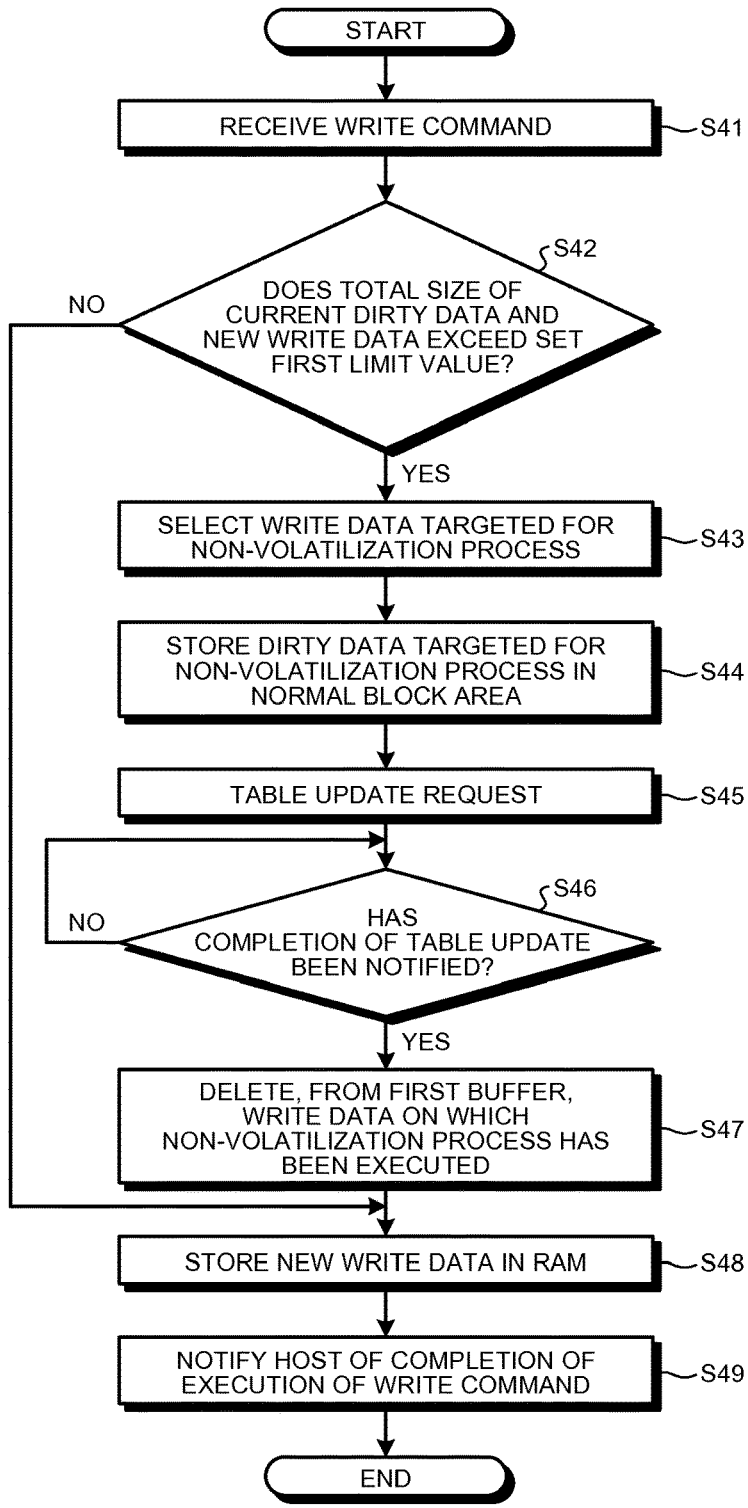
FIG. 17 is a flowchart illustrating operations of a fifth embodiment in accordance with a write command.

FIG. 17 is a flowchart illustrating operations of a fifth embodiment in accordance with a write command. When the host I/F controller 14 has received a write command (S41), the processing unit 151 determines whether or not the total size of the dirty write data 301 stored in the first buffer 171 (expressed as the current dirty data) and write data to be written by the write command received in the process of S41 (expressed as the new write data) exceeds the set first limit value 303 (S42).

In a case where the total size of the current dirty data and the new write data exceeds the set first limit value 303 (S42, Yes), the processing unit 151 sets part or all of the current dirty data as a target of the non-volatilization process as in the process of S33 (S43). The processing unit 151 stores, in the normal block area 107, the dirty data set as the target of non-volatilization by the process of S43 (S44).

Following the process of S44, the processing unit 151 issues a table update request (S45). The table update request is a request to update a corresponding relationship between a logical address and a physical address. The processing unit 151 internally issues the table update request in the process of S45.

The processing unit 151 executes a process in accordance with the table update request. The processing unit 151 processes the table update request with, for example, operations described in a sixth embodiment. The processing unit 151 issues a notice of the completion of the table update when the process of the table update request is complete.

Following the process of S45, the processing unit 151 determines whether or not the completion of the table update has been notified (S46). For example, the processing unit 151 determines whether or not the completion of the table update corresponding to the table update request issued by the process of S45 has been notified. In a case where the completion of the table update has not been notified (S46, No), the processing unit 151 reexecutes the determination process of S46.

In a case where the completion of the table update has been notified (S46, Yes), in other words, in a case where the update of the corresponding relationship between the logical address and the physical address is complete, the amount of the current dirty data is reduced by the amount of the write data 301 targeted for non-volatilization. The processing unit 151 deletes, from the first buffer 171, the write data 301 on which the non-volatilization process has been executed (S47). Deleting data from the buffer indicates, for example, freeing (releasing) the area where the data is stored among the area forming the buffer. After the process of S47, or in a case where the total size of the current dirty data and the new write data does not exceed the set first limit value 303 (S42, No), the processing unit 151 receives the new write data from the host 2, and stores the received new write data in the first buffer 171 (S48). The processing unit 151 then notifies the host 2 of the completion of execution of the write command (S49), and ends the operations in accordance with the write command.

In this manner, in the fifth embodiment, the processing unit 151 restricts the reception of the new write data to control the amount of dirty data. Moreover, in a case of storing dirty data in the normal block area 107, the processing unit 151 issues a table update request. After the process corresponding to the table update request is complete, the processing unit 151 accepts the new write data.

Sixth Embodiment

A table update request is issued in a case where the write data 301 is stored in the normal block area 107. In other words, the table update request is issued by, for example, the process of S45. Moreover, a table update request can also be issued by processes other than the process of S45. For example, when the write data 301 is stored in the normal block area 107 as part of garbage collection, the processing unit 151 issues a table update request. Moreover, a table update request may also be issued in cases other than the case where the write data 301 is stored in the normal block area 107. For example, the processing unit 151 issues a table update request in a case of executing an UNMAP process. The UNMAP process is a process to terminating the corresponding relationship between the logical address and the physical address. The UNMAP process is, for example, executed by the processing unit 151 in accordance with a command from the host 2.

Figure 18:
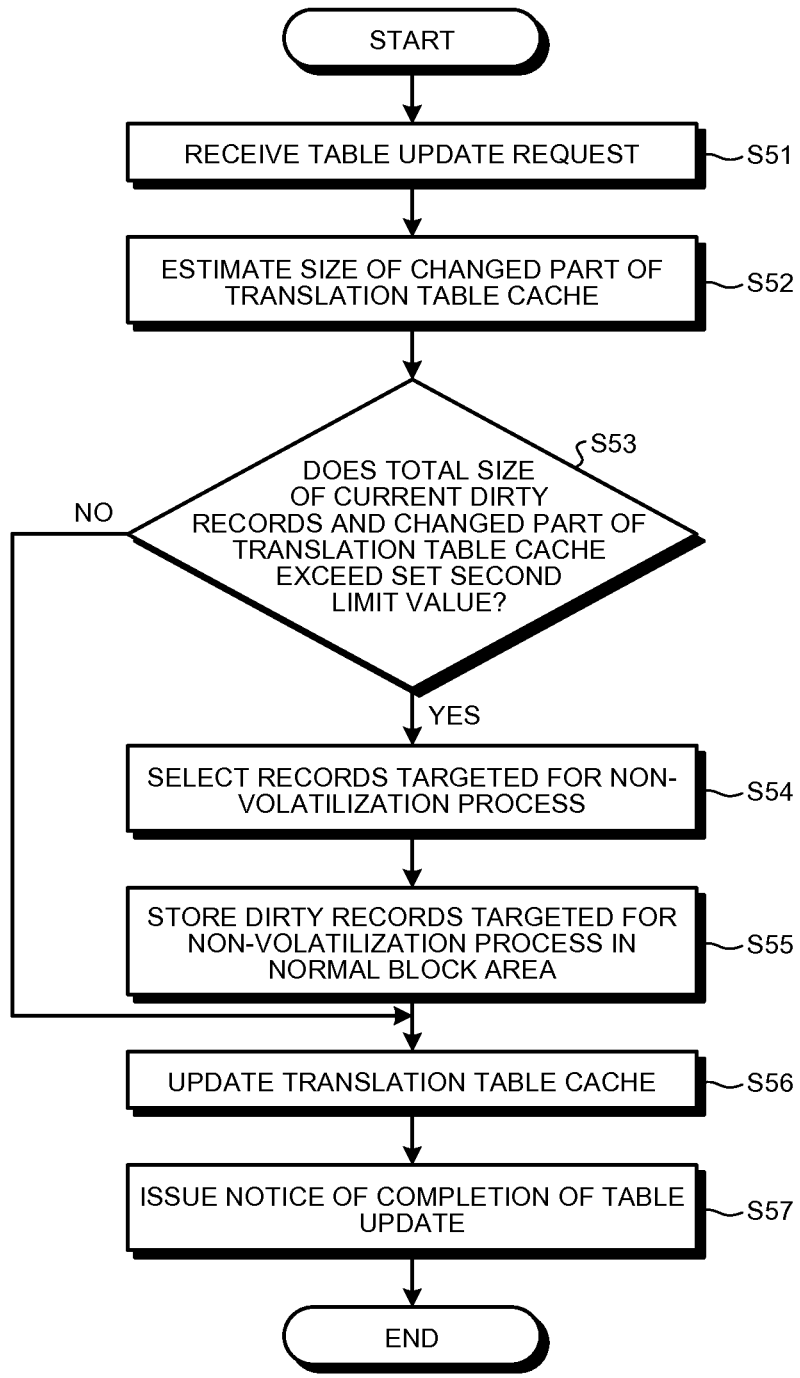
FIG. 18 is a flowchart illustrating operations of the fifth embodiment in accordance with a table update request.

FIG. 18 is flowchart illustrating operations in accordance with a table update request. When having received a table update request (S51), the processing unit 151 estimates the size of a changed part of the translation table cache 302 (S52). The processing unit 151 then executes a process similar to the process of S34 in S53 (S53). In other words, the processing unit 151 determines whether or not the total size of dirty records stored in the second buffer 172 (expressed as the current dirty records) and the changed part of the translation table cache 302 exceeds the set second limit value 304. In a case where the total size of the current dirty records and the changed part of the translation table cache 302 exceeds the set second limit value 304 (S53, Yes), the processing unit 151 executes the same processes as S35 and S36 in S54 and S55.

In a case where the total size of the current dirty records and the changed part of the translation table cache 302 does not exceed the set second limit value 304 (S53, No), or after the process of S55, the processing unit 151 updates the translation table cache 302 in response to storing the write data 301 in the normal block area 107 (S56). For example, in a case where the table update request targeted to be processed is issued by the process of S45, the processing unit 151 updates the translation table cache 302 in response to storing the write data 301 in the normal block area 107 by the process of S44. After the process of S55, the processing unit 151 issues a notice of the completion of the table update (S57), and ends the operations in accordance with the table update request.

In this manner, according to the sixth embodiment, the processing unit 151 controls the update of the translation table cache 302 to control the amount of dirty records.

Seventh Embodiment

Figure 19:
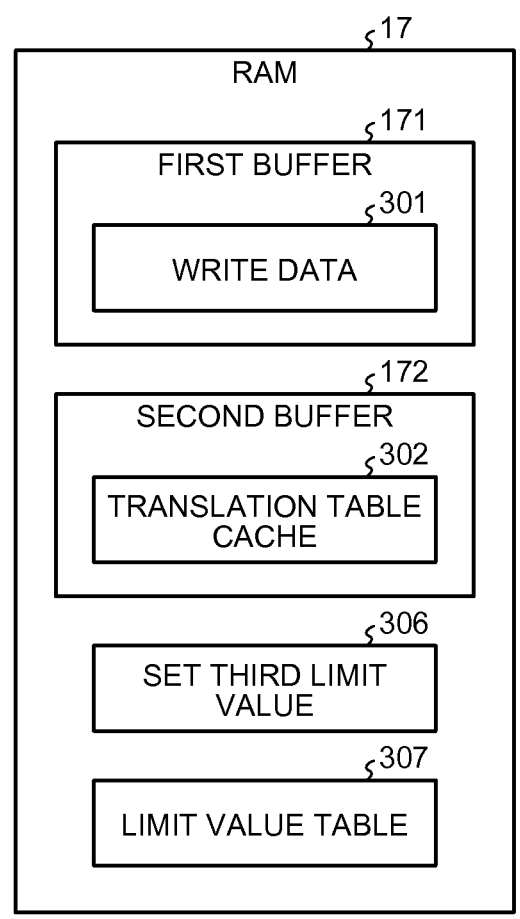
FIG. 19 is a diagram illustrating a memory structure example of a seventh embodiment of the RAM 17.

FIG. 19 is a diagram illustrating a memory structure example of a seventh embodiment of the RAM 17. The first buffer 171 and the second buffer 172 are allocated in the RAM 17. The write data 301 is stored in the first buffer 171. The translation table cache 302 is stored in the second buffer 172. Moreover, a set third limit value 306 and a limit value table 307 are stored in the RAM 17.

The limit value table 307 is information which the relationship between the voltage of the battery 13 and the third limit value is described. The third limit value is a limit value set for the total amount of dirty data and dirty records, and is an upper limit of the allowable total amount. The total amount is computed based on the total of the amount of dirty data (the unit is, for example, the number of pages) and the amount of dirty records (the unit is, for example, the number of pages). The set third limit value 306 is expressed in, for example, the number of pages. For example, the third limit value is equal to a total value of the first and second limit values. The set third limit value 306 is a set value of the third limit value. The processing unit 151 sequentially updates the set third limit value 306 based on the voltage of the battery 13 and the limit value table 307 during a period of transition until the battery 13 reaches the fully charged state.

Figure 20:
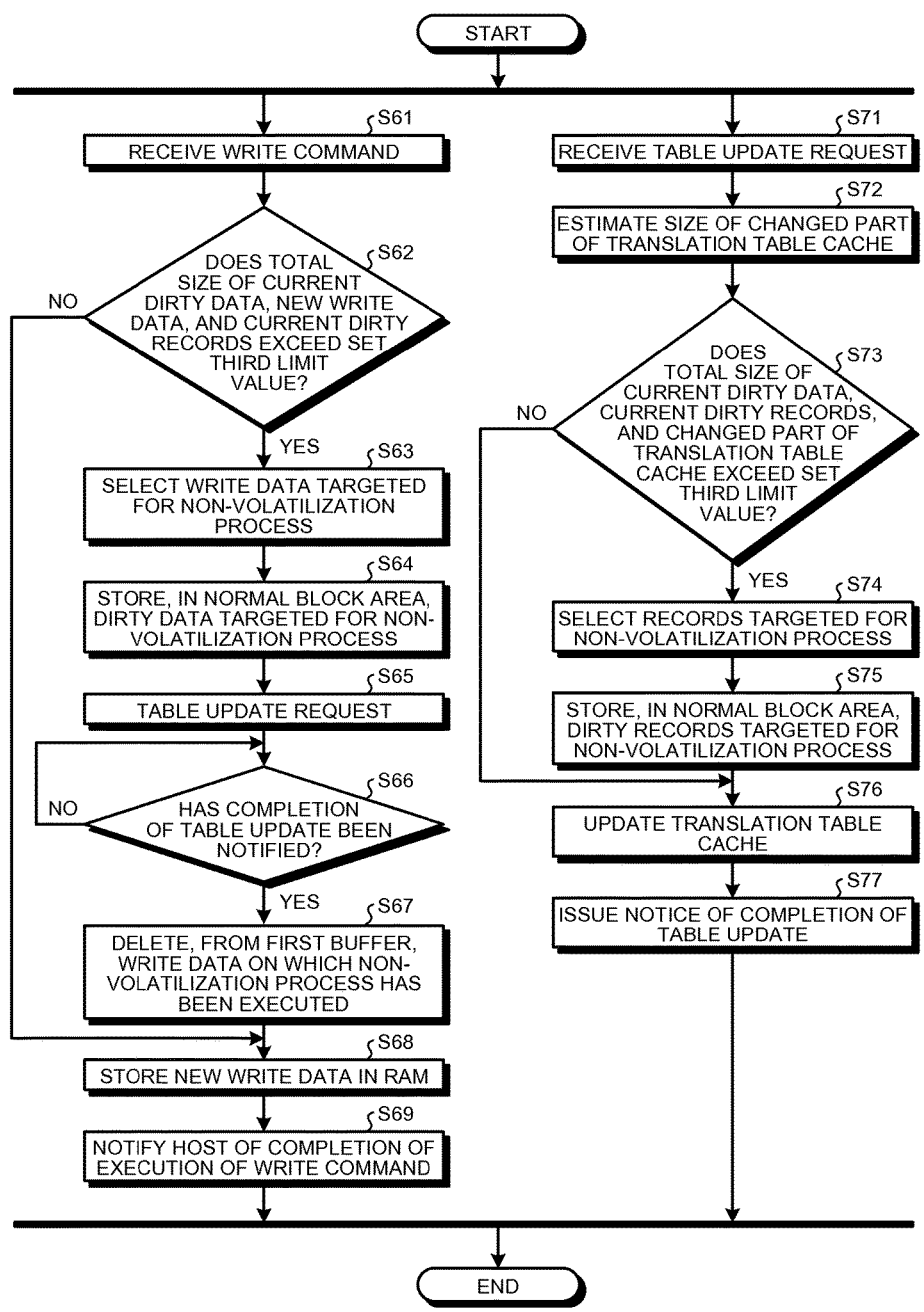
FIG. 20 is a flowchart illustrating operations of the seventh embodiment.

FIG. 20 is a flowchart illustrating operations of the seventh embodiment. The processing unit 151 executes, in parallel, a process in accordance with a write command, and a process in accordance with a table update request issued in the process in accordance with the write command. The processing unit 151 executes the process in accordance with the write command in S61 to S68, and executes the process in accordance with the table update request in S71 to S76.

When the host I/F controller 14 has received the write command (S61), the processing unit 151 determines whether or not the total size of the dirty write data 301 stored in the first buffer 171 (expressed as the current dirty data), write data to be written by the write command received in the process of S61 (expressed as the new write data), and dirty records stored in the second buffer 172 (expressed as the current dirty records) exceeds the set third limit value 306 (S62).

In a case where the total size of the current dirty data, the new write data, and the current dirty records exceeds the set third upper limit 306 (S62, Yes), the processing unit 151 sets part or all of the current dirty data as a target of the non-volatilization process (S63). The processing unit 151 then stores, in the normal block area 107, the dirty data set as the target of non-volatilization by the process of S63 (S64).

Following the process of S64, the processing unit 151 issues a table update request (S65). The processing unit 151 then determines whether or not the completion of the table update has been notified (S66). In a case where the completion of the table update has not been notified (S66, No), the processing unit 151 reexecutes the determination process of S66. In a case where the completion of the table update has been notified (S66, Yes), the processing unit 151 deletes, from the first buffer 171, the write data 301 on which the non-volatilization process has been executed (S67). After the process of S67, or in a case where the total size of the current dirty data, the new write data, and the current dirty records does not exceed the set third upper limit 306 (S62, No), the processing unit 151 receives the new write data from the host 2, and stores the received new write data in the first buffer 171 (S68). The processing unit 151 then notifies the host 2 of the completion of execution of the write command (S69).

When having received the table update request (S71), the processing unit 151 estimates the size of the changed part of the translation table cache 302 (S72). The processing unit 151 then determines whether or not the total size of the current dirty data, the current dirty records, and the changed part of the translation table cache 302 exceeds the set third limit value 306 (S73). In a case where the total size of the current dirty data, the current dirty records, and the changed part of the translation table cache 302 exceeds the set third limit value 306 (S73, Yes), the processing unit 151 executes the same processes as S35 and S36 in S74 and S75.

In a case where the total size of the current dirty data and the changed part of the translation table cache 302 does not exceed the set third limit value 306 (S73, No), or after the process of S75, the processing unit 151 updates the translation table cache 302 in response to storing the write data 301 in the normal block area 107 (S76). For example, in a case where the table update request targeted to be processed is issued by the process of S65, the processing unit 151 updates the translation table cache 302 in response to storing the write data 301 in the normal block area 107 by the process of S64. After the process of S76, the processing unit 151 issues a notice of the completion of the table update (S77).

In this manner, in the seventh embodiment, the processing unit 151 controls the reception of new user data and the update of the translation table cache 302 in such a manner as to prevent the total value of dirty data and dirty records from exceeding the set third limit value 306. Limit values may be respectively set for the dirty data and the dirty records as in the first embodiment and the like.

Eight Embodiment

Figure 21:
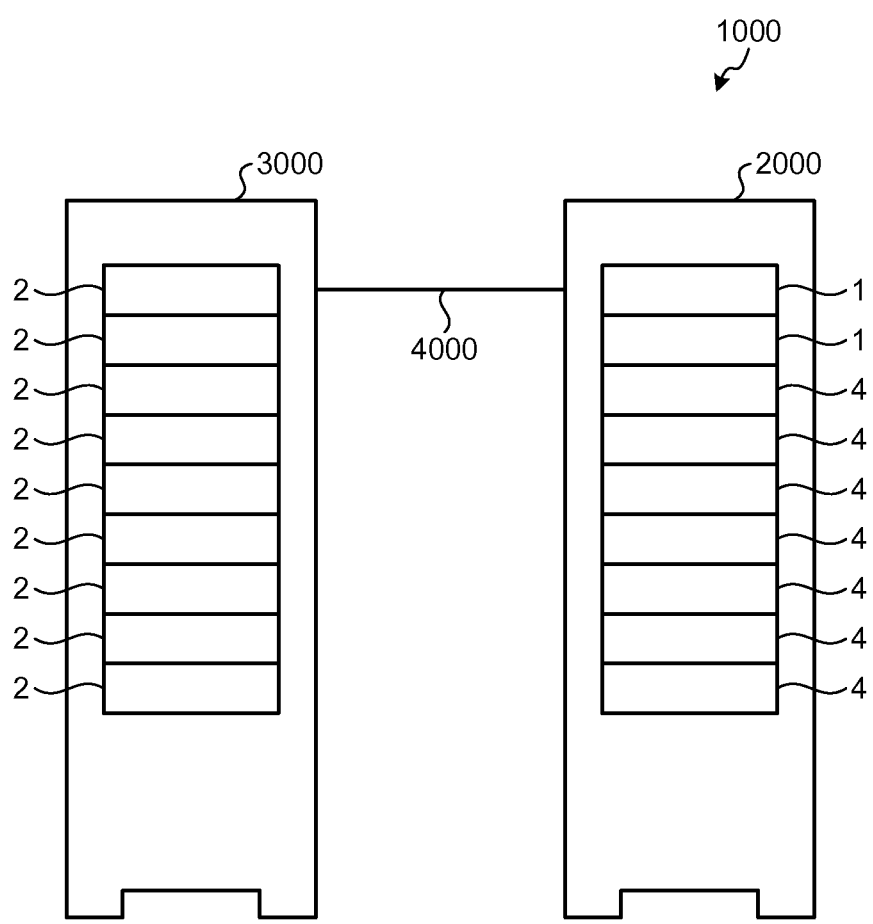
FIG. 21 is a diagram illustrating an implementation example of the memory system.

FIG. 21 is a diagram illustrating an implementation example of the memory system. The memory system 1 is implemented in, for example, a server system 1000. A disk array 2000 and a rack mount server 3000 are connected by a communication interface 4000 to configure the server system 1000. Any standard can be adopted as a standard of the communication interface 4000. One or more hosts 2 are mounted in a server rack to configure the rack-mount server 3000. The plurality of hosts 2 can access the disk array 2000 via the communication interface 4000.

Moreover, one or more memory systems 1 and one or more hard disk units 4 are mounted in a server rack to configure the disk array 2000. Moreover, the disk array 2000 includes the power source 3 that supplies the power to the units 1 and 4. Each memory system 1 can execute a command of each host 2. Moreover, the first to seventh embodiments are applied to each memory system 1. Therefore, each memory system 1 can start the acceptance of a command and the execution of the command without waiting the completion of the charge of the battery 13 upon startup.

In the disk array 2000, for example, the one or more memory systems 1 are used as caches of the one or more hard disk units 4. A storage controller unit that builds RAID in the one or more hard disk units 4 may be mounted on the disk array 2000.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory;
   a buffer;
   a battery configured to store energy supplied from an outside of the memory system; and
   a processing circuit configured to,
      after stop of the supply of energy from the outside, stop acceptance of a write request from the outside and save first data in the buffer into the nonvolatile memory using the energy stored in the battery,
      after start of the supply of the energy from the outside and start of charging the energy to the battery, perform recovery of second data that correspond to first data saved in the nonvolatile memory,
      after the recovery is completed and before a voltage of the battery reaches a set value, start the acceptance of a write request from the outside, start a write process in accordance with the accepted write request, the write process using the buffer, and restrict an amount of third data in the buffer referring to the voltage of the battery, the third data being dirty data stored in the buffer after the recovery is completed, wherein
   the processing circuit computes a limit value based on the referred voltage and writes the third data in the buffer into the nonvolatile memory to prevent the amount of the third data in the buffer from exceeding the computed limit value, wherein
   the nonvolatile memory includes a plurality of memory cells,
   the processing circuit,
      after the recovery is completed and before the voltage of the battery reaches the set value, writes, in first mode, the third data in the buffer into the nonvolatile memory,
      after the recovery is completed and the voltage of the battery reaches the set value, writes, in second mode, the third data in the buffer into the nonvolatile memory, and
   the second mode is a mode where a storage capacity of each of the plurality of memory cells is larger than that of the first mode.

2. The memory system according to claim 1, wherein
   the buffer includes a plurality of sub-buffers, and
   the processing circuit shuts off the supply of energy to a sub-buffer in which no data are stored, among the plurality of sub-buffers.

3. The memory system according to claim 1, wherein the processing circuit saves, in the first mode, the first data in the buffer into the nonvolatile memory.

4. The memory system according to claim 1, wherein
   the third data is data requested to write by the outside and not written to the nonvolatile memory yet, and
   the processing circuit controls the acceptance of the third data to prevent the amount of the third data in the buffer from exceeding the computed limit value.

5. The memory system according to claim 1, wherein
   the processing circuit manages corresponding information between a logical address and a physical address, and generates changed information, the changed information being an updated part of the corresponding information or an added part of the corresponding information, and
   the third data is the changed information.

6. The memory system according to claim 5, wherein the processing circuit controls the updating of the corresponding information and prevents an amount of the changed information in the buffer from exceeding the computed limit value.

7. A memory system comprising:
   a nonvolatile memory which includes a plurality of memory cells;
   a buffer;
   a battery configured to store energy supplied from an outside of the memory system;
   a processing circuit configured to, after start of the supply of energy from the outside:
      in a case where the battery is in a first state, write data in the buffer into the nonvolatile memory in a first mode, the first state being a state where a voltage of the battery is smaller than a set value; and
      in a case where the battery is in a second state, write data in the buffer into the nonvolatile memory in a second mode, the second state being a state where the voltage of the battery is larger than the set value,
      the second mode being a mode where a storage capacity of each of the plurality of memory cells is larger than that of the first mode.

8. The memory system according to claim 7, wherein after the start of the supply of energy from the outside, the processing circuit
   starts acceptance of a request from the outside,
   starts a process in accordance with the accepted request, the process using the buffer, and
   writes the data in the buffer into the nonvolatile memory using the energy stored in the battery after stop of the supply of energy from the outside.

9. The memory system according to claim 8, wherein the processing circuit writes the data in the buffer in the first mode into the nonvolatile memory after the stop of the supply of energy from the outside.

10. The memory system according to claim 8, wherein the processing circuit refers to the voltage of the battery and restricts an amount of the data in the buffer.

11. The memory system according to claim 10, wherein the processing circuit
    computes a limit value based on the referred voltage and writes the data in the buffer into the nonvolatile memory to prevent the amount of the data in the buffer from exceeding the computed limit value.

12. The memory system according to claim 7, wherein
    the buffer includes a plurality of sub-buffers, and
    the processing circuit shuts off the supply of energy to a sub-buffer in which no data are stored, among the plurality of sub-buffers.

13. The memory system according to claim 11, wherein
    the nonvolatile memory includes a first memory chip and a second memory chip, and wherein
    after the start of the supply of energy from the outside, the processing circuit:
       in a case where the battery is in the first state, writes the data in the buffer into the nonvolatile memory in a third mode; and
       in a case where the battery is in the second state, writes the data in the buffer into the nonvolatile memory in a fourth mode,
       the third mode being a mode where one of the first memory chip and the second memory chip is operated and the other is not operated at a time,
       the fourth mode being a mode where both of the first memory chip and the second memory chip are operated at a time.

14. The memory system according to claim 11, wherein
the data is data requested to write by the outside and not written to the nonvolatile memory yet, and
the processing circuit controls the acceptance of data requested to write by the outside, to prevent the amount of the data in the buffer from exceeding the computed limit value.

15. The memory system according to claim 11, wherein
the processing circuit manages corresponding information between a logical address and a physical address, and generates changed information, the changed information being an updated part of the corresponding information or an added part of the corresponding information, and
the data is the changed information.

16. The memory system according to claim 15, wherein the processing circuit controls the updating of the corresponding information and prevents an amount of the changed information in the buffer from exceeding the computed limit value.

17. A memory system comprising:
a nonvolatile memory;
a buffer;
a battery configured to store energy supplied from an outside of the memory system; and
a processing circuit configured to,
after stop of the supply of energy from the outside, stop acceptance of a write request from the outside and save first data in the buffer into the nonvolatile memory using the energy stored in the battery,
after start of the supply of the energy from the outside and start of charging the energy to the battery, perform recovery of second data that correspond to first data saved in the nonvolatile memory,
after the recovery is completed and before a voltage of the battery reaches a set value, start the acceptance of a write request from the outside, start a write process in accordance with the accepted write request, the write process using the buffer, and restrict an amount of third data in the buffer referring to the voltage of the battery, the third data being dirty data stored in the buffer after the recovery is completed, wherein
the processing circuit computes a limit value based on the referred voltage and writes the third data in the buffer into the nonvolatile memory to prevent the amount of the third data in the buffer from exceeding the computed limit value, wherein
the nonvolatile memory includes a first memory chip and a second memory chip, and
the processing circuit,
after the recovery is completed and before the voltage of the battery reaches the set value, writes, in a first mode, the third data in the buffer into the nonvolatile memory,
after the recovery is completed and the voltage of the battery reaches the set value, writes, in a second mode, the third data in the buffer into the nonvolatile memory,
the first mode is a mode where one of the first memory chip and the second memory chip is operated and the other is not operated at a time, and
the second mode is a mode where both of the first memory chip and the second memory chip are operated at a time.

18. The memory system according to claim 17, wherein
the buffer includes a plurality of sub-buffers, and
the processing circuit shuts off the supply of energy to a sub-buffer in which no data are stored, among the plurality of sub-buffers.

19. The memory system according to claim 17, wherein
the third data is data requested to write by the outside and not written to the nonvolatile memory yet, and
the processing circuit controls the acceptance of the third data to prevent the amount of the third data in the buffer from exceeding the computed limit value.

20. The memory system according to claim 17, wherein
the processing circuit manages corresponding information between a logical address and a physical address, and generates changed information, the changed information being an updated part of the corresponding information or an added part of the corresponding information, and
the third data is the changed information.

* * * * *